(12) United States Patent
Yeckley et al.

(10) Patent No.: US 7,335,615 B2
(45) Date of Patent: Feb. 26, 2008

(54) METHOD OF MACHINING A WORKPIECE USING A CERAMIC CUTTING INSERT INCLUDING ALUMINA AND BORON CARBIDE

(75) Inventors: Russell L. Yeckley, Latrobe, PA (US); Shanghua Wu, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/648,949

(22) Filed: Jan. 3, 2007

(65) Prior Publication Data

US 2007/0107569 A1    May 17, 2007

Related U.S. Application Data

(60) Division of application No. 11/311,209, filed on Dec. 19, 2005, now Pat. No. 7,217,674, which is a continuation of application No. 11/063,480, filed on Feb. 23, 2005, now abandoned.

(51) Int. Cl.
*C04B 35/563* (2006.01)
*C04B 35/117* (2006.01)

(52) U.S. Cl. .......................... 501/87; 501/127; 82/11.1

(58) Field of Classification Search ................ 501/87, 501/127; 82/11.1
See application file for complete search history.

(56) References Cited

U.S. PATENT DOCUMENTS

| 4,343,909 A | 8/1982 | Adams et al. |
| 4,366,254 A | 12/1982 | Rich et al. |
| 4,463,058 A | 7/1984 | Hood et al. |
| 4,474,728 A | 10/1984 | Radford |
| 4,543,343 A | 9/1985 | Iyori et al. |
| 4,745,091 A | 5/1988 | Landingham |
| 4,789,277 A | 12/1988 | Rhodes et al. |
| 4,804,643 A | 2/1989 | Chyung et al. |
| 4,826,630 A | 5/1989 | Radford et al. |
| 4,886,768 A | 12/1989 | Tien |
| 4,946,807 A | 8/1990 | Okuno et al. |

(Continued)

FOREIGN PATENT DOCUMENTS

EP    0 194 881    6/1989

(Continued)

OTHER PUBLICATIONS

Dorre et al., "Alumina, Processing, Properties, and Applications", Springer-Verlag (1984) pp. 254-265.

(Continued)

*Primary Examiner*—Karl E Group
(74) *Attorney, Agent, or Firm*—John J. Prizzi

(57) ABSTRACT

A method of machining a workpiece including the steps of providing a workpiece; providing a ceramic cutting insert having a rake surface and a flank surface wherein the rake surface and the flank surface intersect to form a cutting edge and the ceramic cutting insert having a substrate that comprises between about 15 volume percent and about 35 volume percent of a boron carbide phase and at least about 50 volume percent alumina and has a fracture toughness ($K_{IC}$, 18.5 Kg Load E&C) greater than or equal to about 4.5 MPa·m$^{0.5}$; causing relative rotational movement between the workpiece and the ceramic cutting insert wherein the surface speed of the relative rotational movement is equal to or greater than about 457 surface meters per minute; and bringing the ceramic cutting insert and the workpiece into contact with each other so as to remove material from the workpiece.

15 Claims, 11 Drawing Sheets
(5 of 11 Drawing Sheet(s) Filed in Color)

U.S. PATENT DOCUMENTS

| | | | |
|---|---|---|---|
| 4,959,331 | A | 9/1990 | Mehrotra et al. |
| 4,961,757 | A | 10/1990 | Rhodes et al. |
| 5,059,564 | A | 10/1991 | Mehrotra et al. |
| 5,162,270 | A | 11/1992 | Ownby et al. |
| 5,164,345 | A | 11/1992 | Rice et al. |
| 5,194,073 | A | 3/1993 | Winter et al. |
| 5,271,758 | A | 12/1993 | Buljan et al. |
| 5,279,191 | A | 1/1994 | Buljan |
| 5,370,716 | A | 12/1994 | Mehrotra et al. |
| 5,398,858 | A | 3/1995 | Dugan et al. |
| 5,404,836 | A | 4/1995 | Milewski |
| 5,688,729 | A | 11/1997 | Andersson et al. |
| 5,718,541 | A | 2/1998 | Bryant |
| 6,204,213 | B1 | 3/2001 | Mehrotra et al. |
| 6,383,963 | B1 | 5/2002 | Yamamoto et al. |
| 6,417,126 | B1 | 7/2002 | Yang |
| 6,447,896 | B1 | 9/2002 | Augustine |
| 6,905,992 | B2 | 6/2005 | Mehrotra et al. |
| 7,087,544 | B2 * | 8/2006 | Satcher et al. ............ 501/87 |
| 2002/0195752 | A1 | 12/2002 | Yang |
| 2003/0008761 | A1 | 1/2003 | Yang |
| 2003/0224924 | A1 | 12/2003 | Satcher et al. |

FOREIGN PATENT DOCUMENTS

| | | |
|---|---|---|
| EP | 0 366 234 B1 | 9/1992 |
| EP | 0 506 640 A1 | 9/1992 |
| EP | 0 335 602 B1 | 12/1993 |
| EP | 0 579 587 A1 | 1/1994 |
| EP | 0 584 051 A1 | 2/1994 |
| EP | 0 208 910 B2 | 11/1996 |
| JP | 02307862 A | 12/1990 |
| JP | 3137061 | 6/1991 |
| JP | 03137061 A | 6/1991 |
| JP | HEI 3-137061 | 6/1991 |
| JP | 63282158 | 11/1998 |
| WO | WO 92/07102 | 4/1992 |
| WO | WO 03/011782 A2 | 2/2003 |

OTHER PUBLICATIONS

Whitney, "Modern Ceramic Cutting Tool Materials", Presentation at Oct. 1982 ASM Metals Congress in St. Loius, MO, pp. 1-16.

Billman, "Machining with Al2O3-SiC Whisker Cutting Tools" Ceramic Bulletin, vol. 67 No. 6 (1998) pp. 1016-1019.

Liu & Ownby, "Physical Properties of Alumina-Boron Carbide Whisker/Particle Composites", Ceramic Eng. Sci. Pro. 12 (7-8)pp. 1245-1253 (1991).

Liu et al., "Boron Containing Ceramic Particulate and Whisker Enhancment of Fracture Toughness of Ceramic Matrix", (1991) American Institue of Physics, pp. 574-577.

Liu et al., "Boron Carbide Reinforced Alumina Composites", Journal American Ceramic Society 74 (3) (1991) pp. 674-677.

Jung et al., "Sintering and Characterization of Al2O3-B4C Composites", Journal of Material Science 26 (19991) pp. 5037-5040.

E. Dow Whitney et al., "New and Improved Cutting Tool Materials", Air Force Report AFML-TR-69-50 (1969) pp. 7, 114, 119-126, 186, 188, 197,339-340,368-369.

Lin et al., "Densification of B4CWhisker Reinforced Al2O3 Matrix Composites", Proceedings from First China International Conference, (Oct. 1998, Beijing) pp. 415-419.

Liu et al., "Enhanced Mechanical Properties of Alumina by Dispersed Titanium Diboride Particulate Inclusions", Jr. Am. Ceramic Soc. 74(1) pp. 241-243 (1991).

Sato et al., "Sintering and Fracture Behavior of Composites Based on Alumina-Zirconia (Yttria)-Nonoxides", Journal de Physique, Colc Cl, No. 2, Tome 47 (Feb. 1986) pp. CI733-CI737.

Becher, "Microstructural Design of Toughened Ceramics" Jr. Am. Ceramic Soc. 74 (2) (1991) pp. 255-269.

Becher, "Recent Advances in Whisker-Reinforced Ceramics", Annu. Rev. Materials Sci. 1990 20: 179-95.

Belyaev et al., "Properties of Al2O3-B4C Samples Obtained By the Hot Pressing Method", Translated from Neorganicheskie Materialy, vol. 22 No. 6 pp. 960-962 (Jun. 1986).

Brook et al., "Nanocomposite Materials", Materials World, Jan. 1993 pp. 27-30.

Cameron et al., "A Comparison of Reaction vs Conventionally Hot-Pressed Ceramic Composites", Ceram. Eng. Sci. Proc. 11 (9-10) 1990 pp. 1190-1202.

Fisher, "Internal Audits Assure Quality Control", Ceramic Industry, Mar. 1983 pp. 36-38.

Grearson et al., "Wear of Ceramics in Grit Blasting", Br. Ceram. Trans. J., 88, pp. 213-218 (1989).

Green et al., "Hardness, Friction an Wear Engineering Ceramics in the Temperature Range 20-1500C", Journal of Hard Materials, vol. 3, No. 2 (1992) pp. 169-183.

Lin et al. "Pressureless Sintering of B4C Whisker Reinforced Al2O3 Matrix Composites", Journ. Mater. Sci. 35, (2000) pp. 411-418.

Lin et al., "Mechanical Behavior Microstructure and Phase Composition of Free Sintered Al2O3-B4C Whiser Composites", Cer. Engineer Sci.Pro., vol. 17 No. 3 pp. 273-277 (1996).

Liu et al., "Boron Carbide Whisker and Platelet Reinforced Ceramic Matrix Composites", Journ. Cer. Eng. Sci. Proc. (1992) vol. 13 No. 9-10 pp. 696-703.

Milewski et al., "Whiskers" Journal Handb. Fillers Reinf. Plast. (1978) pp. 446-464.

Moon et al. "Plasma Sintering of Al2O3-B4C Composites", Journal of Mater. Synthesis and Proc., vol. 3 No. 2 (1995) pp. 115-120.

Radford, "Sintering Al2O3-B4C Ceramics" Journal of Materials Science 18 (1983) pp. 669-678.

Rice, "Machanisms of Toughening in Ceramic Matrix Composites", Ceram. Eng. Sci. Proc. 1981, vol. 2 No. 7-8 pp. 661-701.

Schuldies et al., "Ceramic Composites: Emerging Processes, Applications", Ceramic Industry May 1992 pp. 43-46.

Seals, "TMT Focuses on Advanced Materials for Composites", Ceramic Industry, Dec. 1991 pp. 32-34.

Shetty, "Ceramic Matrix Composites", Metals and Ceramics Info. Ctr. CAB, Dec. 1982, Issue No. 118, pp. 1-4.

Stevens, "An Introduction to Zirconia, Zirconia and Zirconia Ceramics", Magnesium Elektron Ltd., Jul. 1996, 51 pages.

Chapter 4 "Ceramics Based on Alumina: Incerasing the Hardness for Tool Applications", by. A. Krell, found in Handb of Cer. Hard Materials published by Wiley-VCH, pp. 648-682.

Chapter 7 Boride-Based Hard Materials:, by Telle et al., found in Handb of Cer. Hard Materials published by Wiley-VCH pp. 802-895, 933-945.

Grewe et al., "Whisker-Reinforced Ceramics", Journal CFI-Ceramic Forum International vol. 64, No. 8-9 pp. 303,306-308,313-317.

Xu et al., "Two-State Optimal Approach for the Compostion of Alumina Matrix Ceramic Composites . . . and Boron Carbide Particulates", Jr. Chinese Cer. Soc. vol. 26, No. 1 (1998).

Huang et al., "Contral of Boron Quantity in B4C Dispersed Al2O3 Pellete during Sintering", Zhongnan Kuangye Xueyuan Xuebao 1994, vol. 25 No. 5 pp. 625-628.

Huang et al., "Sintering Behavior of B4C- Dispersed Al2O3 Pellets", Jr. of Central-South Institute of Mining and Metallurgy, vol. 20, No. 1 Feb. 1989 pp. 59-65.

Internet Brochure, Electro Abrasives, Service That Cuts it . . . Products That Cut It! Date unknown, 1 page.

Internet Brochure, "Electro Abrasives, Electro Abrasive Products", Date unknown, 1 page.

Internet Brochure, "Electro Abrasives, Boron Carbide", Date unknown, 3 pages.

Internet Brochure, "Electro Abrasives, Applications", Date unknown, 2 pages.

Internet Brochure, "Electro Abrasives, Corporate Profile", Date unknown, 2 pages.

Internet Brochure, "Dynamic Ceramic, Materilas", Date unknown, 2 pages.

Internet Article, "Properties, Applications and Product Information of Boron Carbide B4C" by C. T. Kang, Ph. D. Date unknown, 4 page.

Internet Brochure, "CERAM Technology, Boron Carbide", Date unknown, 4 pages.
Internet Brochure, "Boron Carbide Powder", Date unknown, 3 pages.
Tubitak et al., "Al2O3-B4C Kompozit Seramiklerin Sinterlenmesi Ve Karakterizasyonu", Int'l. Metaallurgy and Materials Congress Jun. 6-9, 1995 pp. 1317-1322.
Oliveira, "Analise Microestrutural de Alumina-Carceto de Boro (Al2O3-B4C)", CERAMICA 42 (277) SET/OUT, 1996 pp. 622-625.
Jung, Choong-Hwan et al., "Machining of Hot Pressed Alumina-Boron Carbide Composite Cutting Tool", Int'l Journal of Refractory Metals & Hard Materials 23 (May 2005), pp. 8171-8173.
Dole et al., "Microstructural Coarsening During Sintering of Boron Carbide", J. Am. Cer. Soc. 72 (6) pp. 958-966 (1989).
Lee et al., "Pressureless Sintering of Boron Carbide", J. Am. Cer. Soc. 86 (9) pp. 1468-1473 (2003).
Lee et al., "Sintering of Boron Carbide Heat-Treated with Hydrogen", J. Am. Cer. Soc. 85 (8) pp. 2131-2133 (2002).

Dongsheng et al., "Control of Boron Content During Sintering of B4C-Dispersed Al2O3 Pellets", Jr. of Central South Institute of Mining and Metallurgy (Oct. 1994) 4 pages.
Dongsheng et al., "Sintering Behavior of B4C-Disperesed Al2O3 Pellets", Journal of Central South Institute of Mining and Metallurgy (Feb. 1989) 7 pages.
Kim et al., "Densification and Mechanical Properties of B4C with Al2O3 as a Sintering Aid" J. Am. Cer. Soc. 83 (11)(2000) pp. 2863-2865.
Notification of Transmittal of the International Search Report and the Written Opinion of the International Searching Authority PCT/US06/06952, mailed Feb. 15, 2006 ( 1 page).
International Search report for PCT US06/06952 mailed Feb. 15, 2006 (5 pages).
Written Opinion of the International Searching Authority for PCT US06/06952 mailed Feb. 15, 2006 (4 pages).

* cited by examiner

T10828 1500 SFM/.015 IPR/.100 DOC/DRY
5 CA340-58(F800 B4C/SM8 AI203, YB203, #3485)
80-55-06 DCI RUN1 6 MIN 1/A

T10828 1500 SFM/.015 IPR/.100 DOC/DRY
5 CA340-58(F800 B4C/SM8 AI203, YB203, #3485)
80-55-06 DCI RUN1 6 MIN 1/A

METHOD OF MACHINING A WORKPIECE USING A CERAMIC CUTTING INSERT INCLUDING ALUMINA AND BORON CARBIDE

CROSS-REFERENCE TO EARLIER APPLICATION

This patent application is a divisional patent application to patent application Ser. No. 11/311,209 filed on Dec. 19, 2005 for an ALUMINA-BORON CARBIDE CERAMICS AND METHODS OF MAKING AND USING THE SAME by Wu and Yeckley (now U.S. Pat. No. 7.217,674 issued on May 15, 2007), which is a continuation-in-part to now abandoned U.S. patent application Ser. No. 11/063,480 filed on Feb. 23, 2005 now abandoned for ALUMINA-BORON CARBIDE CERAMICS AND METHODS OF MAKING AND USING THE SAME by Wu and Yeckley and wherein all of the patent applications are assigned to Kennametal Inc. of Latrobe, Pa. 15650.

BACKGROUND OF THE INVENTION

The disclosure of the present patent application pertains to a ceramic body that contains alumina and boron carbide, as well as a method of making the same and a method of using the same. More specifically, the disclosure of the present patent application pertains to a ceramic body (for use as a ceramic cutting insert or a substrate for a coated ceramic cutting insert or a ceramic wear part) that contains alumina and a boron carbide phase, as well as a method (e.g., hot pressing method or a pressureless sintering-HIPping method) of making the same and a method of using the same.

Ceramic materials have been used as cutting inserts and as wear members for a number of years. These ceramic materials include silicon nitride or silicon nitride-based ceramics, SiAlON or SiAlON-based ceramics, and alumina or alumina-based ceramics. One of the first ceramic cutting inserts was an alumina cutting insert. See Dörre et al., "Alumina, Processing, Properties, and Applications", Springer-Verlag (1984), pages 254-265. The alumina cutting insert was essentially over 99.7 percent alumina. Later on, the alumina ceramic was modified by the addition of titanium carbide. See Whitney, "Modem Ceramic Cutting Tool Materials", Presentation at October, 1982 ASM Metals Congress in St. Louis, Mo.

Over the passage of time, there have been a number of other additives useed in conjunction with alumina to form an alumina-based ceramic cutting insert. Examples of the additives include the use of silicon carbide whiskers such as the ceramics that appear to be disclosed in the U.S. Pat. No. 4,789,277 to Rhodes et al. and U.S. Pat. No. 4,961,757 to Rhodes et al. In an alumina-SiC whisker ceramic, the Rhodes et al. patents appears to show that the ($K_{IC}$) fracture toughness increased (4.15 to 8.9 MPa·m$^{0.5}$) as the SiC whisker content increased from 0 to 24 volume percent. The Rhodes et al. patents then appear to show that the fracture toughness decreased (8.9 to 7.6 MPa·m$^{0.5}$) as the SiC whisker content increased from 24 to 35 volume percent. European Patent No. 0 335 602 B1 to Lauder appears to disclose the use of silicon carbide whiskers in alumina along with the addition of additives like zirconia, yttria, hafnia, magnesia, lanthana or other rare earth oxides, silicon nitride, titanium carbide, titanium nitride or mixtures thereof. The use of silicon carbide whiskers along with alumina is described in Billman et al., "Machining with $Al_2O_3$—SiC Whisker Cutting Tools", Ceramic Bulletin, Vol. 67, No. 6 (1988) pages 1016-1019. U.S. Pat. No. 4,343,909 to Adams et al. appears to disclose the use of zirconia and titanium diboride along with alumina (and a sintering aid). U.S. Pat. No. 4,543,343 to Iyori et al. discloses the use of titanium boride and zirconia along with alumina.

In the article written by Liu and Ownby (Liu et al. entitled "Physical Properties of Alumina-Boron Carbide Whisker/Particle Composites" *Ceramic Eng. Sci. Proc.* 12 (7-8) pp.1245-1253 (1991) there is a disclosure of a ceramic comprising alumina and boron carbide particles. In this regard, the Liu et al. composites appear to disclose alumina (A16SG from Alcoa)-boron carbide particle (0.2 to 7 μm particles size) composites along with boron carbide that is present in amounts of 5.0, 10.0, 15.0 and 20.0 volume percent (the balance equals alumina). The examples were either sintered at 1500° C. or 1600° C. for 3 hours or hot-pressed under the hot pressing parameters that comprised a temperature equal to 1520° C. for a duration equal to 20 minutes. The sintered composites had a density less than 80 percent of the theoretical density. The hot pressed ceramics had a density of greater than 98 percent of the theoretical density. The hot pressing pressure seems to be absent from the disclosures of this Liu et al. article.

This Liu et al. article appears to show that the fracture toughness (measured by the Chevron Notched Short Rod (CNSR) technique) improves from 0 volume percent boron carbide particles to 5.0 volume percent boron carbide particles wherein the fracture toughness of the 5.0 volume percent boron carbide particle-alumina ceramic equals about 5.2 MPa·m$^{0.5}$. However, the fracture toughness drops off at boron carbide particle contents greater than 5.0 volume percent. More specifically, the fracture toughness diminishes at boron carbide particle contents of 10.0, 15.0 and 20.0 volume percent. The fracture toughness of the 20.0 volume percent boron carbide particle-alumina ceramic appears to equal about 4.5 MPa·m$^{0.5}$. Liu et al also shows that the flexural strength improves from 0 volume percent boron carbide particles to 5.0 volume percent boron carbide particles. The 5.0 volume percent boron carbide particle-alumina material has a flexural strength equal to about 575 MPa. The flexural strength levels off (i.e., remains essentially the same) at boron carbide particle contents greater than 5.0 volume percent (i.e., boron carbide particle contents of 10.0, 15.0 and 20.0 volume percent). The 20.0 volume percent boron carbide particle-alumina material has a flexural strength equal to about 590 MPa.

In the article (1991—American Institute of Physics) written by Liu et al. entitled "Boron Containing Ceramic Particulate and Whisker Enhancement of the Fracture Toughness of Ceramic Matrix Composites" there is a disclosure of a ceramic comprising alumina and boron carbide particles. These Liu et al composites appear to disclose α-alumina-boron carbide particle composites wherein the boron carbide is present in amounts of 5.0, 10.0, 15.0 and 20.0 volume percent (the balance equals alumina). The examples were hot-pressed under the hot pressing parameters that comprised a temperature equal to 1480° C. so that the ceramic had a density of greater than 98 percent of the theoretical density. The hot pressing duration and the hot pressing pressure appear to be absent from the disclosure of this Liu et al. article.

The Liu et al. articles show that the fracture toughness (CNSR technique) improves from 0 volume percent boron carbide particles to 5.0 volume percent boron carbide particles wherein the fracture toughness of the 5.0 volume percent boron carbide particle-alumina ceramic equals about 5.5 MPa·m$^{0.5}$. However, the fracture toughness drops off at boron carbide particle contents greater than 5.0 volume percent. More specifically, the fracture toughness diminishes at boron carbide particle contents of 10.0, 15.0 and 20.0 volume percent. The fracture toughness of the 20.0 volume percent boron carbide particle-alumina ceramic appears to equal about 4.6 MPa·m$^{0.5}$.

In the article written by Liu et al. entitled "Boron Carbide Reinforced Alumina Composites" *Journal American Ceramic Society* 74 (3) pp. 674-677 (1991)) there is a disclosure of a ceramic comprising alumina and boron carbide particles. The Liu et al. composites appear to disclose fine α-alumina (A16SG from Alcoa)-boron carbide "shard like" particle (0.2 to 7 μm particles size) composites along with boron carbide that is present in amounts of 5.0, 10.0, 15.0 and 20.0 volume percent (the balance equals alumina). The examples were hot-pressed under the hot pressing parameters that comprised a temperature equal to 1520° C. for duration equal to 20 minutes so that the ceramic had a density of greater than 98 percent of the theoretical density. The hot pressing pressure seems to be absent from the disclosures of the Liu et al. articles.

This Liu et al. article appears to show that the fracture toughness (CNSR technique) improves from 0 volume percent boron carbide particles to 5.0 volume percent boron carbide particles wherein the fracture toughness of the 5.0 volume percent boron carbide particle-alumina ceramic equals about 5.3 MPa·m$^{0.5}$. However, the fracture toughness drops off at boron carbide particle contents greater than 5.0 volume percent. More specifically, the fracture toughness diminishes at boron carbide particle contents of 10.0, 15.0 and 20.0 volume percent. The fracture toughness of the 20.0 volume percent boron carbide particle-alumina ceramic appears to equal about 4.6 MPa·m$^{0.5}$. Liu et al also shows that the flexural strength improves from 0 volume percent boron carbide particles to 5.0 volume percent boron carbide particles. The 5.0 volume percent boron carbide particle-alumina material has a flexural strength equal to about 580 MPa. The flexural strength levels off (i.e., remains essentially the same) at boron carbide particle contents greater than 5.0 volume percent (i.e., boron carbide particle contents of 10.0, 15.0 and 20.0 volume percent). The 20.0 volume percent boron carbide particle-alumina material has a flexural strength equal to about 600 MPa.

The Jung and Kim article entitled "Sintering and Characterization of Al$_2$O$_3$-B$_4$C composites", Journal of Material Science 26 (1991) pp. 5037-5040 concerns the sintering of alumina-boron carbide composites. According to the article, for composites sintered at 1850° for 60 minutes the density was about 97 percent for a boron carbide content that ranged between 5 to 20 volume percent boron carbide. According to the Jung et al. article, the flexural strength had a maximum value of 550 MPa for an alumina-20 volume percent boron carbide composite that had been sintered at 1850° for 60 minutes. According to the Jung et al. article, for a composite sintered at 1850° for 60 minutes. The Vickers micro-hardness increased with increasing boron carbide content to 30 volume percent. For this same composite, the fracture toughness slightly increases with increasing boron carbide contents up to 20 volume percent. The maximum fracture toughness is 4 MPa·m$^{1/2}$.

In the article entitled "Microstructural Coarsening During Sintering of Boron Carbide" by Dole et al. (*J. Am. Ceram. Soc.* 72 (6) pages 958-966 (1989), it was reported that pressureless sintering of boron carbide at 2300° C. produced only limited densification due to microstructural coarsening. According to the article entitled "Pressureless Sintering of Boron Carbide" by Lee et al., *J. Am. Ceram. Soc.* 86(9) pages 1468-1473 (2003), improved densities for pressureless sintered boron carbide bodies were obtained via rapid heating to liquid phase sintering temperatures so as to shorten the time for coarsening to occur. Further, the addition of carbon apparently caused a reaction with the boron oxide (B$_2$O$_3$) coating so as to improve densification. According to the article entitled "Sintering of Boron Carbide Heat-Treated with Hydrogen" by Lee et al., *J. Am. Ceram. Soc.* 85(8) pages 2131-2133 (2002), hydrogen gas in the sintering atmosphere was used to extract the boron oxide coating on the boron carbide particles, and as a result, the process achieved a pressureless sintered boron carbide body that exhibited a theoretical density equal to 94.7 percent.

In the article by Dongsheng et al. entitled "Control of Boron Content During Sintering of B$_4$C-dispersed Al$_2$O$_3$ Pellets" in *Journal of Central South Institute of Mining and Metallurgy* (October 1994) carbon is added to alumina (Al$_2$O$_3$) and boron carbide (B$_4$C) to reduce the loss of boron during sintering, and thereby achieve precise control of the boron content in B$_4$C—Al$_2$O$_3$ pellets. According to this article, these B$_4$C—Al$_2$O$_3$ are used in nuclear reactor cores and the boron content in these pellets affects the magnitude of neutron flux in the core. The article states that the reason the carbon controls the boron content is that microparticles of carbon contained in the pellets oxidize before the B$_4$C, and can even reduce and carbonize the B$_2$O$_3$ to B$_4$C.

The article by Donsheng et al. entitled "Sintering behavior of B$_4$C-dispersed Al$_2$O$_3$ Pellets" in *Journal of Central South Institute of Mining and Metallurgy* (February 1989) also concerned Al$_2$O$_3$-B$_4$C pellets used in nuclear reactors. This article looked at the impact of particle sizes, as well as other factors, on properties of the sintered pellets.

Air Force Report AFML-TR-69-50 by E. Dow Whitney entitled "New and Improved Cutting Tool Materials" (1969) discloses an alumina-boron carbide composite. At page 119, the Report reads:

> The metal carbides, WC, TaC, TiC, B$_4$C and SiC were selected as additives for improving the general properties of hot presses alumina. Mixtures of Al$_2$O$_3$ containing 1.25 wt. % of each additive were hot pressed at 1600° C., 2600 psi, for 30 minutes in a nitrogen atmosphere. In Figures 147 to 149 are shown the heating densification curves of these systems. Density increased rapidly from about 1200° C. and reached almost 100% relative density at temperatures below 1600° C.

Table 52 of the Air Force Report appears to show that the addition of 1.25 weight percent boron carbide to alumina increased the MOR from 30,700 psi (for alumina) to 42,500 psi (alumina+1.25 weight percent boron carbide), but the hardness decreased from 94.2 (R$_N$15) to 93.7 (R$_N$15).

U.S. Pat. No. 5,271,758 to Buljan et al. pertains to an alumina-based composite that can include boron carbide and a Ni—Al metallic phase. Example 20 comprises" 8 v/o (Ni,Al), 27.6 v/o B$_4$C and 64.4 v/o Al$_2$O$_3$. U.S. '758 does not appear to specifically recite a hot pressing process for Example 20. PCT Patent Publication WO 92/07102 to Buljan et al. published Apr. 30, 1992) appears to be related to U.S. '758. U.S. Pat. No. 5,279,191 to Buljan appears to disclose an alumina-based ceramic that may include boron carbide. U.S. '191 requires the use of SiC reinforcement and a Ni—Al metal phase.

U.S. Pat. No. 5,162,270 to Ownby et al. pertains to an alumina ceramic that has boron carbide whisker reinforcement. FIG. 1 appears to show specific compositions in which the boron carbide whiskers appear to comprise 0, 5.0, 10.0, 15.0, 20.0 and 30.0 volume percent of the composite (the balance alumina). These samples were hot pressed at 1520° C. under a pressure equal to 7500 psi to achieve a density equal to greater than abut 98 percent of theoretical density. The maximum fracture toughness (about 7.1 Mpa·m$^{0.5}$) occurs at 15.0 volume percent boron carbide whiskers. There is a slight decrease in the fracture toughness (about 7.1 MPa·m$^{0.5}$ to about 7.0 MPa·m$^{0.5}$) when boron carbide whisker content exceeds 15 volume percent. U.S. Pat. No. 5,398,858 to Dugan et al. mentions the use of boron carbide whiskers to reinforce alumina. The specific application for the ceramic is in a roller guide.

The article by Liu and Ownby entitled "Densification of B$_4$C Whisker Reinforced Al$_2$O$_3$ Matrix Composites", Proceedings of the First China International Conference on High-Performance Ceramics (October, 1998, Beijing) pp. 415-419 pertains to the sintering of boron carbide whisker-alumina composites. The boron carbide whisker contents were (in volume percent): 0, 5, 10, 15, 20, 25, 30, 35 and 40.

The article by Liu et al. entitled "Enhanced Mechanical Properties of Alumina by Dispersed Titanium Diboride Particulate Inclusions", Journal American Ceramic Society 74(1) pp. 241-243 (1991) discloses the use of titanium diboride particles to improve mechanical properties of alumina. FIG. 2 shows the impact of the boron carbide particle content in an alumina-based ceramic on the flexural strength wherein the boron carbide content ranges from 0 to 20.0 volume percent. Like in the other articles to Liu et al., the flexural strength appears to level off (or remain steady) for boron carbide contents that exceed 5.0 volume percent.

U.S. Pat. No. 4,745,091 to Landingham discloses an alumina-based ceramic that has a nitride modifier (e.g. AlN or Si$_3$N$_4$) and dispersion particles. A listing of the dispersion particles mentions boron carbide. According to the '091 patent, the nitride modifier can range from 0.1 to 15.0 weight percent, and the dispersion particles can range between 0.1 and 40.0 weight percent. There do not appear to be any actual examples that use boron carbide as dispersion particles.

U.S. Pat. No. 6,417,126 B1 to Yang discloses an alumina-based composite with a boride (e.g., boron carbide) and metal carbide (e.g., silicon carbide). The examples appear to disclose compositions comprising alumina, silicon carbide, and boron carbide wherein the boron carbide ranges between 0.5 and 5.4 weight percent. U.S. '126 appears to disclose that the principal use of the ceramic is an industrial blast nozzle. U.S. Patent Application Publication US2002/0195752 A2 to Yang appears to be related to U.S. '126. European Patent 0 208 910 to Suzuki et al. appears to disclose the use of boron carbide along with SiC whiskers in an alumina composite.

U.S. Pat. No. 5,164,345 to Rice et al. relates to an alumina-boron carbide-silicon carbide composite. The end product is the result of heating silicon dioxide, boron oxide, aluminum and carbon.

The article by Sato et al., "Sintering and Fracture Behavior of Composites Based on Alumina-Zirconia (Yttria)—Nonoxides", Journal de Physique, Colloque C1, Supplement No. 2, Tome 47, February 1986 pp. C1-733 through C1-737 pertains to the sintering of alumina-containing composites including an alumina-zirconia-boron carbide composite. Table 1 of Sato et al. shows various properties of a 50 volume percent Al$_2$O$_3$—40 volume percent ZrO$_2$ (no yttria)—10 volume B$_4$C composite, and an 80 volume percent Al$_2$O$_3$—10 volume percent ZrO$_2$ (no yttria)—10 volume percent B$_4$C composite. Each composite was hot pressed at 1500° C. and 2 GPa for a duration of 30 minutes.

The article by Becher entitled "Microstructural Design of Toughened Ceramics" Journal American Ceramic Society 74(2) pp. 255-269 (1991) discusses toughening mechanisms. The principal toughening mechanism is crack-bridging. Additives include silicon carbide whiskers, tetragonal zirconia and monoclinic zirconia.

U.S. Pat. No. 4,474,728 to Radford and U.S. Pat. No. 4,826,630 to Radford each discloses pellets that comprise alumina and boron carbide. These pellets appear to be useful as neutron absorbers.

While there have been ceramic bodies that comprise alumina and boron carbide, there remains a need to provide an improved ceramic body that contains alumina and a boron carbide phase. There also remains the need to provide a method of making, as well as a method of using such an improved ceramic body that contains alumina and boron carbide. Further, there also remains the need to provide such a ceramic body of alumina and boron carbide that exhibits properties that are especially useful for metalcutting. In addition, there remains a need to provide a method of making (and a method of using) such a ceramic body of alumina and boron carbide that exhibits properties especially useful for metal cutting.

Exemplary of these properties is the ability of the ceramic body to maintain its hardness even at higher operating temperatures, especially those temperatures associated with higher cutting speeds. Another exemplary property is the ability of the ceramic body to exhibit good chemical resistance with respect to the workpiece material even at high operating temperatures, especially those associated with higher cutting speeds.

Each one of these properties by itself, and especially when combined together, provide for a ceramic body that is particularly useful as a ceramic cutting insert for applications at higher cutting speeds wherein there are generated higher operating temperatures. For example, a higher cutting speed contemplated by applicants for ductile cast iron could be a speed equal to or greater than about 1500 surface feet per minute (about 457 surface meters per minute), and more preferably, a higher cutting speed equal to or greater than about 2000 surface feet per minute (610 surface meters per minute).

We have found that hot pressing is one method that has been used to make the above ceramic body containing alumina and boron carbide. Hot pressing has produced ceramic bodies, which contain alumina and boron carbide, that exhibit acceptable properties including properties that make the ceramic body particularly useful for metalcutting.

While the hot-pressing process has produced an acceptable ceramic material, the hot-pressing process typically has experienced drawbacks. One of these drawbacks is associated with the high cost to perform the hot-pressing process. Such a high cost increases the overall cost to produce the ceramic body, and especially a ceramic used as a metalcutting insert. Another of these drawbacks was the inability of the hot-pressing process to permit the cost-effective fabrication of parts that presented a complicated or complex shape or geometry. Such hot pressing is thus not cost-effective for the fabrication of parts with a complicated or complex shape. It would be advantageous if the scope of applicable products for the alumina-boron carbide ceramic would be such to include being fabricated by cost-effective methods.

Thus, another process to densify a powder compact would be sintering including pressureless sintering. Pressureless sintering would be a more desirable process as compared to hot-pressing because of the lower cost associated therewith, as well as the ability of the pressureless sintering process to fabricate in a cost-effective fashion parts with a complicated or complex shape or geometry. However, heretofore, the pressureless sintering of alumina-boron carbide powder compacts had difficulty in achieving closed porosity due to the loss of boron during sintering.

It is apparent that it would be highly desirable to provide an alumina-boron carbide ceramic and a process of making the same that is not as expensive to perform as compared to hot-pressing. If such a process were available, there would be expected to be a decrease in the overall cost to produce the ceramic body.

It is also apparent that it would be highly desirable to provide an alumina-boron carbide ceramic and a process of making the same wherein the process provides for the ability to fabricate in a cost-effective fashion parts with a complicated or complex shape or geometry. If such a process were available, there would be an increase in the scope of applicable products for the alumina-boron carbide ceramic.

It becomes apparent that it would be highly desirable to provide a sintered alumina-boron carbide ceramic body, as well as a sintering process to make an alumina-boron carbide ceramic body that exhibits acceptable properties including acceptable properties that make it suitable for use as a metalcutting insert.

SUMMARY OF THE INVENTION

In one form, the invention is a method of machining a workpiece including the steps of providing a workpiece; providing a ceramic cutting insert having a rake surface and a flank surface wherein the rake surface and the flank surface intersect to form a cutting edge and the ceramic cutting insert having a substrate that comprises between about 15 volume percent and about 35 volume percent of a boron carbide phase and at least about 50 volume percent alumina and has a fracture toughness ($K_{IC}$, 18.5 Kg Load E&C) greater than or equal to about 4.5 MPa·m$^{0.5}$; causing relative rotational movement between the workpiece and the ceramic cutting insert wherein the surface speed of the relative rotational movement is equal to or greater than about 457 surface meters per minute; and bringing the ceramic cutting insert and the workpiece into contact with each other so as to remove material from the workpiece.

In another form, the invention is a method of machining a workpiece comprising the steps of: providing a workpiece; providing a ceramic cutting insert having a rake surface and a flank surface wherein the rake surface and the flank surface intersect to form a cutting edge and the ceramic cutting insert having a substrate that has a fracture toughness ($K_{IC}$, 18.5 Kg Load E&C) greater than or equal to about 4.5 MPa·m$^{0.5}$, and wherein the substrate being formed from a starting powder mixture comprising between about 15 volume percent and about 50 volume percent of a boron carbide irregular-shaped phase and at least about 50 volume percent alumina, and the starting powder mixture further comprising an effective amount to achieve full densification of a metal component including one or more of aluminum, magnesium and zinc; causing relative rotational movement between the workpiece and the ceramic cutting insert wherein the surface speed of the relative rotational movement is equal to or greater than about 457 surface meters per minute; and bringing the ceramic cutting insert and the workpiece into contact with each other so as to remove material from the workpiece.

BRIEF DESCRIPTION OF THE DRAWINGS

The patent or application file contains at least one drawing executed in color. Copies of this patent with color drawing(s) will be provided by the Patent and Trademark Office upon request and payment of the necessary fee.

The following is a brief description of the drawings wherein these drawings form a part of this patent application.

DETAILED DESCRIPTION OF SPECIFIC EMBODIMENTS

Figure 1:
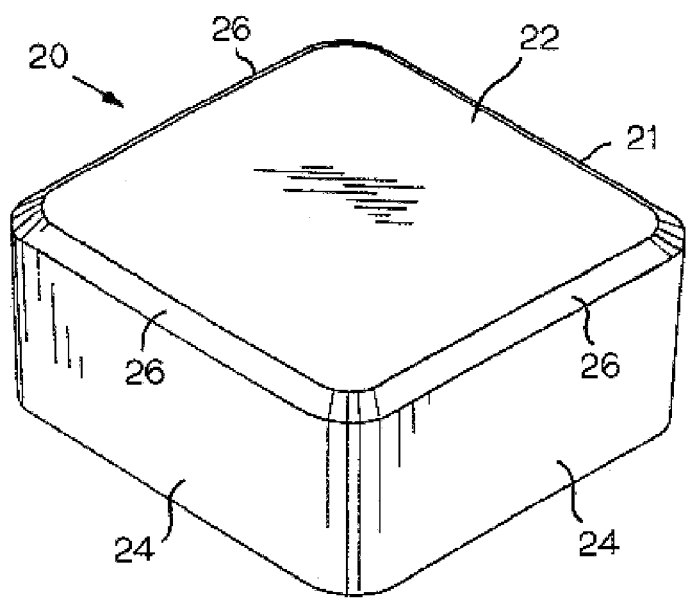
FIG. 1 is an isometric view of a ceramic cutting insert that embodies the invention.

Referring to the drawings, FIG. 1 shows an embodiment of an indexable ceramic cutting insert, i.e., a ceramic body, generally designated as 20. Ceramic cutting insert 20 comprises a substrate 21 that has a rake surface 22 and flank surfaces 24 wherein a cutting edge 26 is at the intersection of the rake surface 22 and the flank surfaces 24.

Throughout this description, selected physical properties of the ceramic body (or ceramic substrate) are set forth. In regard to the method to determine these properties, the fracture toughness ($K_{IC}$) (E&C) is determined by the method set forth in Evans & Charles, "Fracture Toughness Determination by Indentation", J. American Ceramic Society, Vol. 59, Nos. 7-8, pages 371-372 using an 18.5 kilogram load. The Young's Modulus is determined by ASTM Standard E111-97 Standard Test Method for Young's Modulus, Tangent Modulus and Chord Modulus. The Vicker's microhardness is determined by ASTM Standard E384-99e1 Standard Test Method for Microindentation Hardness of Materials using an 18.5 kilogram load.

As will become apparent from the description hereinafter, one grouping of specific examples uses hot pressing as the technique to fabricate the substrate of the ceramic body. Another grouping of specific examples uses pressureless sintering followed by hot isostatic pressing (HIPing) to fabricate the substrate of the ceramic body. Although some properties or characteristics of the ceramic body may be discussed in connection with a ceramic body made either by hot pressing or by pressureless sintering-HIPing, such discussion should not necessarily be considered to be limited to a ceramic body made by a specific process. Compositional ranges and other properties discussed in reference to a ceramic body produced by one specific process should not necessarily be restricted to that process, but may be applicable to a ceramic body produced by another process.

The ceramic substrate (or ceramic body) of the ceramic cutting insert produced by hot pressing has a composition that comprises primarily alumina and a boron carbide irregular-shaped phase along with optionally lesser amounts of additives such as, for example, sintering aid residue from an addition of sintering aid to the starting powder mixture. The sintering aid typically comprises in its broader range between about 0.05 volume percent and about 5 volume percent of the starting powder mixture. A preferable range for the sintering aid is between about 0.1 volume percent and about 1.5 volume percent of the starting powder mixture. A more preferable amount of sintering aid in the starting powder mixture is about 0.5 volume percent of the starting powder mixture. For the ceramic substrate, the content (in volume percent) of the alumina in the ceramic is greater than the content (in volume percent) volume percent of the boron carbide irregular-shaped phase in the ceramic. The content (in volume percent) of the boron carbide irregular-shaped phase in the ceramic is greater than any other component, except for the alumina in the ceramic.

Applicants contemplate that other additives may be added in amounts effective to improve the metalcutting performance characteristics (of the inventive ceramic cutting inserts) without undergoing a significant reaction with the boron carbide in the ceramic during the densification of the ceramic body. In this regard, these additives include one or more of the oxides of zirconium and/or hafnium and ceramic whiskers including, for example, silicon carbide whiskers, titanium carbide whiskers, titanium nitride whiskers and titanium carbonitride whiskers.

In one compositional range, the substrate produced via a hot pressing process comprises between about 15 volume percent and about 35 volume percent of a boron carbide irregular-shaped phase and at least about 50 volume percent alumina and sintering aid residue. In another compositional range for the ceramic substrate produced via a hot pressing process, the substrate of the ceramic cutting insert comprises between about 15 volume percent and about 35 volume percent of a boron carbide irregular-shaped phase and between about 65 volume percent and about 85 volume percent alumina and sintering aid residue. In yet another compositional range for the ceramic substrate produced via a hot pressing process, the substrate of the ceramic cutting insert comprises between about 20 volume percent and about 30 volume percent of a boron carbide irregular-shaped phase and between about 70 volume percent and about 80 volume percent alumina and sintering aid residue. In still another composition of the ceramic substrate produced via a hot pressing process, the substrate comprises about 25 volume percent of a boron carbide irregular-shaped phase and about 75 volume percent alumina and sintering aid residue.

The hot-pressed ceramic substrate (or ceramic body) of the ceramic cutting insert exhibits certain physical properties. These physical properties include Young's Modulus (E), fracture toughness ($K_{IC}$) and Vicker's microhardness. Values for these properties are set forth hereinafter.

In one embodiment of the hot-pressed ceramic body, the fracture toughness ($K_{IC}$, 18.5 kg load Evans & Charles) is greater than or equal to about 4.5 MPa·m$^{1/2}$. In another embodiment of the hot-pressed ceramic body, the fracture toughness ($K_{IC}$, 18.5 kg load Evans & Charles) is greater than or equal to about 5.0 MPa·m$^{1/2}$. In another embodiment of the hot-pressed ceramic body, the fracture toughness ($K_{IC}$, 18.5 kg load Evans & Charles) is greater than or equal to about 5.5 MPa·m$^{1/2}$. In still another embodiment of the hot-pressed ceramic body, the fracture toughness ($K_{IC}$, 18.5 kg load Evans & Charles) is greater than or equal to about 6.0 MPa·m$^{1/2}$.

In one embodiment of the hot-pressed ceramic body, the Young's Modulus (ASTM Standard E111-97, Standard Test Method for Young's Modulus, Tangent Modulus and Chord Modulus) is greater than or equal to about 300 GPa. In another embodiment of the hot-pressed ceramic body, the Young's Modulus is greater than or equal to about 350 GPa. In yet another embodiment of the hot-pressed ceramic body, the Young's Modulus is greater than or equal to about 400 GPa.

In one embodiment of the hot-pressed ceramic body, the Vickers microhardness (ASTM Standard E384-99e1, Standard Test Method for Microindentation Hardness of Materials, 18.5 kg load) is greater than or equal to about 17 GPa. In another embodiment of the hot-pressed ceramic body, the Vickers microhardness is greater than or equal to about 18

GPa. In yet another embodiment of the hot-pressed ceramic body, the Vickers microhardness that is greater than or equal to about 19 GPa.

The ceramic body (after hot pressing) has a density that is greater than or equal to about 3.6 grams per cubic centimeter. This equates to a density that is greater than about 99.7 percent of the theoretical density for a composition that comprises about 25 volume percent of a boron carbide irregular-shaped phase and about 75 volume percent alumina and sintering aid residue.

Although the specific embodiment of FIG. 1 is a ceramic body that takes on the form of a substrate for an uncoated indexable ceramic cutting insert, applicants contemplate that the ceramic body has uses other than as a substrate for a ceramic cutting insert. In this regard, the ceramic body may have use as a substrate for a coated ceramic cutting insert including an indexable ceramic cutting insert. In addition, the ceramic body may have use as a wear member. Exemplary wear members include nozzles for shot blasting and abrasive water jet applications.

As mentioned above, one useful technique to produce the ceramic body is hot pressing, and for some of the examples set forth below, hot pressing is the preferred process. However, as also mentioned above, applicants have found that when certain additives are used, the process of sintering to full density produces an acceptable ceramic body that has a satisfactory density, as well as other desirable properties. In this regard, the preferable sintering to full density process comprises pressureless sintering followed by hot isostatic pressing (HIPing).

In general, the hot pressing process comprises the following steps that are described hereinafter. The first step comprises providing a starting powder mixture wherein the starting powder mixture has a composition that falls within one of the compositional ranges contemplated by the invention as set forth in this patent application. The basic components of the starting powder mixture are a majority content of alumina powder, a minority content of boron carbide powder, and a minor content (e.g., about 0.5 volume percent) of a sintering aid or in some cases, another additive as mentioned above (e.g., the oxides of zirconium and/or hafnium and/or ceramic whiskers including, for example, silicon carbide whiskers, titanium carbide whiskers, titanium nitride whiskers and titanium carbonitride whiskers). The sintering aid can comprise one or more materials that are suitable for use as a sintering aid for ceramics. Exemplary sintering aids include oxides such as, for example, chromium oxide, yttrium oxide, yttrium aluminum garnet (YAG), ytterbium oxide, lanthanum oxide and other rare earth oxides.

The second step in the hot pressing process comprises hot pressing the starting powder mixture under pressure and heat to form the ceramic body. The hot pressing conditions are generally defined by the hot pressing temperature, hot pressing pressure and the duration of the hot pressing process. In regard to the hot pressing parameters, the hot pressing temperature has one range that is between about 1400 degrees Centigrade and about 1850 degrees Centigrade, as well as a narrower range that is between about 1400 degrees Centigrade and about 1700 degrees Centigrade. The hot pressing pressure has a range that is between about 20 MPa and about 50 MPa. The hot pressing duration has a range that is between about 20 minutes and about 90 minutes. The hot pressing process may occur under a vacuum (i.e., a pressure equal to or less than about 100 micrometers of mercury) or an inert gas atmosphere.

The hot pressing process produces a ceramic body that exhibits physical properties that include the fracture toughness ($K_{IC}$, 18.5 Kg Load E&C), the Young's Modulus and the Vickers hardness. The typical values of these properties have been set forth in this patent application.

Tests to determine selected physical properties (e.g., Young's Modulus, Vickers microhardness and fracture toughness ($K_{IC}$)), as well as metalcutting performance, were conducted on specific examples (or samples) of the ceramic body to compare the performance of specific examples of the alumina-boron carbide irregular-shaped phase ceramic cutting inserts against the performance of standard cutting inserts. The steps of the process employed to make the alumina-boron carbide irregular-shaped phase ceramic cutting inserts that were the subjects of the tests to determine the physical properties and the metalcutting performance are set forth below.

In regard to the specific powders used in the samples, for most of the examples, the boron carbide powder (which has a blocky-angular shape) was sold by Electro Abrasives (having a place of business at 701 Willet Road, Buffalo N.Y. 14218) under the designation F800 wherein the powder has the following properties: median particle size equal to about 15 micrometers, a surfaces area (as measured by BET) equal to 1.5 $m^2$/gram, an oxygen content equal to 0.64 weight percent, the total boron content=77.5 weight %, the total carbon content=21.5 weight %, iron=0.2 weight %, and the total B+C content=98 weight %. Additional information about the boron carbide powders sold by Electro-Abrasives is available through the website: http:/www.electroabrasives.com/b4C.html.

The other kind of boron carbide powder, which is designated as "HP" in Table 1, was sold under the designation Grade HP by H.C. Starck, Inc. 45 Industrial Place, Newton, Mass. 02461. The Grade HP boron carbide powder has the following chemical characteristics: a B:C ratio=3.8-3.9, minimum of 21.8 weight % carbon, maximum of 0.7 weight nitrogen, maximum of 1.0 weight % oxygen, maximum of 0.05 weight % iron, maximum of 0.15 weight % of silicon, maximum of 0.05 weight percent aluminum, and a maximum of 0.5 weight % of other components. The Grade HP boron carbide powder has the following physical characteristics: specific surface area (TRISTAR 3000 by BET per ASTM D 3663)=6 to 9 $m^2$/gram; green density ($10^3$ $kg/cm^2$) =1.5 to 1.7 $g/cm^2$; particle size distribution with typical values (MASTERSIZER by Laser Light Diffraction per ASTM B 822, deglomeration with high energy ultrasonic before analysis)=D90=6.5 micrometers, D50=2.5 micrometers, D10=0.4 micrometers. The above chemical characteristics and physical characteristics are available from the website http:/www.hcstarck.com and are set forth in the H.C. Starck Data Sheet Number PD-4012.

The alumina powder was sold by Baikowski International (having a place of business at 352 Westinghouse Blvd., Charlotte, N.C. 28273) under the designation SM8 wherein the powder has the following properties: BET specific surface area equal to 10 $m^2$/gram, an alpha crystal structure, an alpha crystallite size/XRD=50 nanometers (nm), an ultimate particle size/TEM=400 nanometers (nm), and a purity greater than 99.99 percent. The agglomerate size distribution/ sedigraph is: D20=0.2 micrometers; D50=0.3 micrometers; D90=0.7 micrometers. This information about the SM8 alumina powder is available at the website: http:/www.baikowski.com.

Another kind of alumina powder was used for at least one other example, and that was alumina powder sold under the designation "HPA-0.5" by Sasol North America, Inc., Ceralox Division, having a place of business at 7800 South Kolb Road, Tucson, Ariz. 85706. The HPA-0.5 alumina powder has the following properties: a purity equal to 99.99 weight percent; a surface area=9.0 m²/gram; a green density equal to 2.19 grams/cubic centimeter; and a particle size distribution of D90=1.2 micrometers, D50=0.4 micrometers and D10=0.2 micrometers. Additional information about the properties and the HPA-0.5 alumina powder can be found at the website: http://www.ceralox.com/Documents/PDF files/TDS-ceramicpowders.pdf.

For the sintering aids, the yttrium oxide powder was sold by Molycorp Inc. (having a place of business at 67750 Bailey Road, Mountain Pass, Calif. 97366) wherein the powder had the following properties: surface area equal to 1.8 m²/gram, a particle size (Microtrac d50) equal to 3-6 micrometers (μm), and a purity equal to greater than 99.0 percent. The ytterbium oxide powder was sold by MolyCorp Inc. under the designation $Yb_2O_3$ 99% and has the following properties: particle size (FAPS) 3 μm max. and a purity greater than 99 percent. The lanthanum oxide powder was sold by MolyCorp Inc. under the designation $La_2O_3$ 99.99% and has the following properties: particle size (FAPS) 5-10 μm maximum and a purity greater than 99.9 percent. The YAG powder was sold by Cerac Inc. (having a place of business at P.O. Box 1178, Milwaukee, Wis. 53201-1178) under the designation Y-2000 and has the following properties: formula is $Y_3Al_5O_{12}$, average particle size—325 mesh and a purity greater than 99.9 percent.

There are other powder components that were used in conjunction with the pressureless sintered ceramic bodies. These powder components will be described in more detail hereinafter.

To produce the starting powder mixture, the mixture of the starting powders of alumina and boron carbide and the sintering aid was subjected to ball-milling using high purity alumina cycloids for a duration equal to about 36 hours in alcohol. After completion of the ball-milling, the powder mixture was dried.

For all of the first grouping of specific examples, each one of the starting powder mixture was hot pressed to form a ceramic body. For all of the first grouping of specific examples, unless indicated to the contrary, the hot pressing was done using a graphite die and graphite rams, and the hot pressing parameters were a temperature equal to about 1650 degrees Centigrade for a duration of about 1 hour under a pressure of about 35 MPa. The ceramic body was then finished ground to form the geometries of the alumina-boron carbide irregular-shaped phase ceramic cutting inserts used in the metalcutting tests set forth below. The geometries of the ceramic cutting inserts are set forth in each of the tables.

Table 1 below sets forth the starting powder compositions for a number of the compositions that are contained in the Tables set forth hereinafter.

TABLE 1

Compositions of the Starting Powder Mixtures for the Hot-Pressed Samples of the Ceramic Cutting Inserts as Reported in the Tables

| Hot-Pressed Sample | Alumina (volume percent) | Boron Carbide Particles (volume percent) | Additive (volume percent) |
|---|---|---|---|
| CA340-30 | 74.6 (SM8) | 24.9 (F800) | 0.5 yttria |
| CA340-62 | 74.6 (SM8) | 24.9 (HP) | 0.5 yttria |
| CA340-57 | 74.6 (SM8) | 24.9 (F800) | 0.5 YAG |
| CA340-58 | 74.6 (SM8) | 24.9 (F800) | 0.5 ytterbia |
| CA340-63 | 74.6 (SM8) | 24.9 (F800) | 0.5 lanthanum oxide |

TABLE 1-continued

Compositions of the Starting Powder Mixtures for the Hot-Pressed Samples of the Ceramic Cutting Inserts as Reported in the Tables

| Hot-Pressed Sample | Alumina (volume percent) | Boron Carbide Particles (volume percent) | Additive (volume percent) |
|---|---|---|---|
| CA340-67 | 74.6 (SM8) | 24.9 (F800) | 0.5 ytterbia |
| AA301-013 | 74.5 (HPA-0.5) | 25 (F800) | 0.5 yttria |
| CA340-59 | 74.25 (SM8) | 24.75 (F800) | 1.0 ytterbia |

Table 1 sets forth herein above presents the compositions of the samples of the hot-pressed ceramic cutting inserts that were subjected to metalcutting tests, and testing for physical properties, wherein the test results are set forth in the Tables in this patent application. The compositions are reported in volume percent of the starting powder mixture. Except for Sample AA301-013, which used the Ceralox HPA-0.5 alumina powder, all of these samples used the SM8 alumina powder described earlier herein. The designation "F800" for the boron carbide powder means that the boron carbide powder was the F800 boron carbide powder from Electro-Abrasives described earlier herein. The designation "HP" for the boron carbide powder means the boron carbide powder was the HP boron carbide powder from H.C. Starck described earlier.

Table 2 set forth herein presents the results of measuring the Young's Modulus according to ASTM Standard E111-97 wherein the results are reported in gigapascals (GPa), the Vicker's Microhardness (18.5 kg load) according to ASTM Standard E384-99e1 wherein the results are reported in gigapascals (GPa), and the fracture toughness ($K_{IC}$) as measured according to Evans & Charles using an 18.5 kg load and reported in MPa·m$^{1/2}$.

TABLE 2

Room Temperature Properties for Selected Hot-Pressed Compositions

| Hot-Pressed Composition | Young's Modulus - E (GPa) | Vickers Microharadness (VHN (GPa) | Fracture Toughness ($K_{IC}$) (MPa · m$^{1/2}$) |
|---|---|---|---|
| AA301-013 | 392 | 18.9 | — |
| CA340-30 | 395 | 18.7 | 5.46 |
| CA340-57 | 414 | 18.3 | 5.00 |
| CA340-58 | 400 | 18.1 | 4.94 |
| CA340-62 | 395 | 18.7 | 4.82 |
| CA340-63 | 399 | 18.1 | 5.09 |

Figure 2:
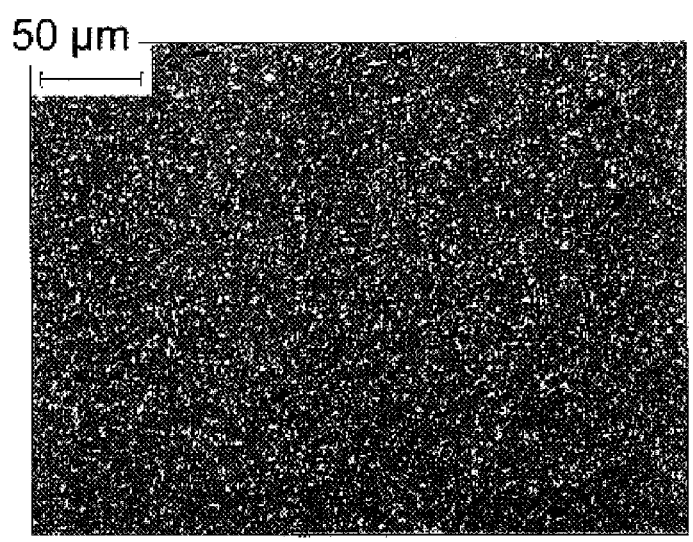
FIG. 2 is a colorized photomicrograph (50 micrometer scale) that shows the microstructure of the ceramic body of Sample CA340-58 that has a starting composition of about 24.9 volume percent boron carbide powder, about 74.6 volume percent alumina powder, and sintering aid residue from 0.5 volume percent of ytterbia (i.e., ytterbium oxide) as a sintering aid in the starting powder mixture, and in the photomicrograph the light phase is boron carbide.

FIG. 2 is a colorized photomicrograph that shows the microstructure of the hot-pressed ceramic body of Sample CA340-58 that has a starting composition set forth in Table 1 and the Room Temperature properties set forth in Table 2. Looking at the photomicrograph (FIG. 2), applicants believe that four phases are shown in FIG. 2. What applicants believe to be the boron carbide ($B_4C$) phase is shown in FIG. 2 as a bright phase. In regard to the ytterbium boride ($YbB_6$) phase, which applicants believe is present, while this phase is visible under a scanning electron microscope, the resolution in this optical photomicrograph (FIG. 2) is such that this phase is difficult to distinguish. Applicants consider the balance of the microstructure shown in FIG. 2 to comprise a matrix. Applicants believe that the matrix comprises an alumina (aluminum oxide) phase and an alumina-based solid solution phase wherein the contrast in color distinguishes between these phases. In this regard, what applicants believe to be the alumina phase is shown in FIG. 2 as the phase of the matrix that is lighter (relative to the other matrix phase) in color, and what applicants believe to be the alumina-based solid solution phase is shown in FIG. 2 as the phase of the matrix that is darker (relative to the other matrix phase) in color.

Figure 3:
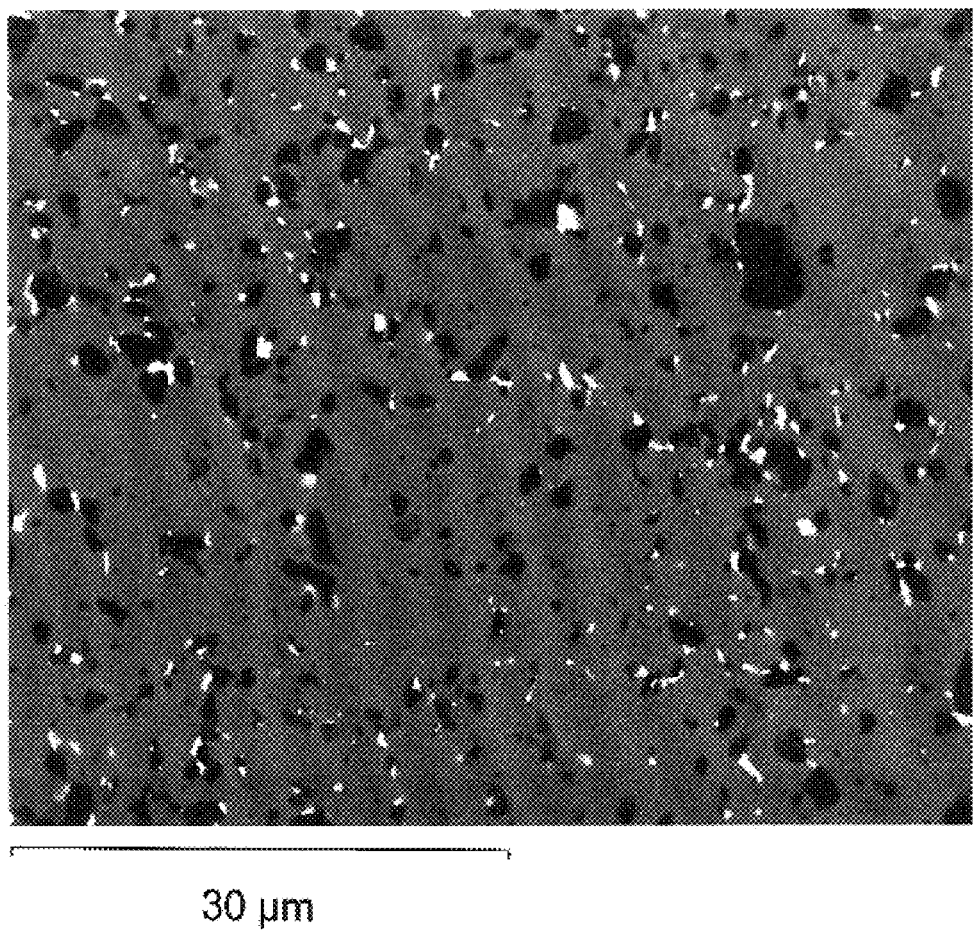
FIG. 3 is a color photomicrograph (30 micrometer scale) that was made via scanning electromicroscopy (SEM) techniques that shows the microstructure of the ceramic body of Sample CA340-59 that has a composition of about 25 volume percent boron carbide powder, about 74 volume percent alumina powder and sintering aid residue from 1.0 volume percent ytterbia (ytterbium oxide) as a sintering aid in the starting powder mixture, and in the photomicrograph the dark phase is the boron carbide and the light phase is a ytterbium-containing compound.

FIG. 3 is a photomicrograph that was made via scanning electromicroscopy (SEM) techniques that shows the microstructure of the hot-pressed ceramic body of Sample CA340-59 that has a composition as set forth in Table 1. Looking at the photomicrograph (FIG. 3), applicants believe that four phases are shown in FIG. 3. What applicants believe to be the boron carbide ($B_4C$) phase is shown in FIG. 3 as a dark phase wherein the boron carbide presents an irregular shape. It can be seen that the boron carbide phase appears to be about 6 micrometers or less, and more typically about 3 micrometers or less, in its major dimension. What applicants believe to be a ytterbium-containing compound (possibly ytterbium boride ($YbB_6$)) phase is shown in FIG. 3 as the bright phase. Applicants consider the balance of the microstructure shown in FIG. 3 to comprise a matrix. Applicants believe that the matrix comprises an alumina (aluminum oxide) phase and an alumina-based solid solution phase wherein the contrast in color distinguishes between these phases. In this regard, what applicants believe to be the alumina phase is shown in FIG. 3 as the phase of the matrix that is lighter (relative to the other matrix phase) in color, and what applicants believe to be the alumina-based solid solution phase is shown in FIG. 3 as the phase of the matrix that is darker (relative to the other matrix phase) in color.

Table 3 set out below reports the results from turning a round clean bar of ductile cast iron (80-55-06) wherein these results show a comparison between a hot-pressed ceramic cutting insert of the invention (designated as Sample AA 301-013 wherein the starting powder composition is set forth in Table 1) and a number of comparative cutting inserts. The inventive ceramic cutting insert (Sample AA 301-013) has a composition of about 25 volume percent of a boron carbide irregular-shaped phase, about 74.5 volume percent alumina, and sintering aid residue from about 0.5 volume percent of yttria sintering aid in the starting powder mixture. Comparative Cutting Insert K090 has a composition that comprises about 30 volume percent titanium carbide and the balance (70 volume percent) alumina. Comparative Insert Kyon1615 has a composition that comprises 75 volume percent alumina-25 volume percent titanium carbonitride. The cutting insert that carries the designation LA 17/02 in the tables has a composition of 75 volume percent alumina-25 volume percent titanium carbonitride. The cutting insert that carries the designation CB347-216 has a composition of 42 volume percent alumina-43 volume percent titanium carbonitride-15 volume percent silicon carbide whiskers. The cutting insert that has the designation alumina-SiC whisker is a cutting insert that has a composition of about 15 volume percent silicon carbide whiskers and the balance (about 85 volume percent) alumina. Comparative Cutting Insert KYON 3400 is a chemical vapor deposition (CVD) coated silicon nitride substrate.

This metalcutting test comprised the turning of a round clean bar of ductile Cast Iron 80-55-06. The turning parameters were: a speed of 1500 surface feet per minute (457 surface meters per minute), a feed of 0.015 inches (0.38 millimeters) per revolution, and a depth of cut of 0.100 inches (2.54 millimeters) d.o.c. The metalcutting was dry, i.e., no coolant. The geometries of the cutting inserts are set forth in Table 3 below wherein the lead angle for all of the cutting inserts was 15 degrees. The geometries are identified according to the American National Standard for Cutting Tools-Indexable Inserts—Identification System, ANSI B212.4-1986. The failure criteria for this test is as follows: Flank Wear (UNIF)=0.020 inches (0.508 mm); Flank Wear (MAX)=0.020 inches (0.508 mm); Nose Wear=0.020 inches (0.508 mm); and Trailing edge wear=0.020 inches (0.508 mm).

TABLE 3

Metalcutting Test Results for Turning at a Speed of 1500 Surface Feet Per Minute of Ductile Cast Iron 80-55-06 Using Different Cutting Inserts

| Tool Material | Geometry | Rep. 1 Tool Life | Rep. 2 Tool Life | Rep. 3 Tool Life | Mean T.L. (minutes) |
|---|---|---|---|---|---|
| AA301-013 | SNG433T0425 | 6.6 | 3.4 | 5.1 | 5.0 |
| K090 | SNG453T0820 | 0.8 | 0.3 | — | 0.4 |
| KYON 1615 | SNG453T0820 | 0.3 | 0.7 | — | 0.3 |
| LA 17/02 | SNG454T0825 | 1.3 | 3.0 | — | 1.4 |
| CB347-216 | SNG453T0425 | 2.0 | 3.3 | 3.0 | 2.8 |
| Alumina-SiC Whisker | SNG453T0820 | 4.7 | 4.1 | 2.0 | 3.6 |
| KYON 3400 | SNG453T0820 | — | 3.1 | 3.1 | 3.1 |

As can be seen from the insert designations set forth in the second column from the left side in Table 3, the sizes, geometries and edge preparations for some of the cutting inserts were different. Based upon applicants' experience, and later verified by additional tests, these differences in sizes, geometries and edge preparations between the cutting inserts that were tested did not have a significant impact upon the test results. Hence, applicants believe that the test results reported in Table 3 comprise a fair comparison between cutting inserts of the invention and the other cutting inserts.

These test results show that the hot-pressed ceramic cutting insert of the invention (Sample AA301-013) exhibited superior tool life when cutting at a speed equal to 1500 sfm (457 smm) as compared to a number of other prior art ceramic cutting inserts. More specifically, the invention showed excellent crater wear and nose wear resistance, as compared with the comparative cutting inserts. The crater wear and nose wear resistance are the key factors for controlling the tool life when cutting (e.g., turning) at a high speed (e.g., a speed equal to 1500 sfm (457 smm)). In other words, better crater wear and nose wear properties result in a longer tool life for a ceramic cutting insert when cutting (e.g., turning) at a high speed (e.g., a speed equal to 1500 sfm (457 smm)).

Table 4 set out below reports the results from turning a round clean bar of ductile cast iron (80-55-06) wherein the results show a comparison between a hot-pressed ceramic cutting insert of the invention (designated as Sample CA340-67) and a comparative cutting insert (Kyon3400). Sample CA340-67 has a composition of about 24.9 volume percent of the boron carbide irregular-shaped phase, about 74.6 volume percent alumina, and sintering aid (ytterbia) residue that is from a starting powder content of sintering aid equal to about 0.5 volume percent. The turning parameters were: a speed of 2000 surface feet per minute (609.6 surface meters per minute), a feed of 0.015 inches (0.38 millimeters) per revolution, and a depth of cut of 0.100 inches (2.54 millimeters) d.o.c. The metalcutting was dry, i.e., no coolant. The geometries of the cutting inserts are set forth in Table 4 below wherein the lead angle for all of the cutting inserts was 15 degrees. The failure criteria for this test is as follows: Flank Wear (UNIF)=0.020 inches (0.508 mm); Flank Wear (MAX)=0.020 inches (0.508 mm); Nose Wear=0.020 inches (0.508 mm); and Trailing Edge Wear=0.020 inches (0.508 mm).

TABLE 4

Metalcutting Test Results (tool life in minutes) for Turning at a Speed of 2000 Surface Feet Per Minute of Ductile Cast Iron 80-55-06

| Tool Material | Geometry | Tool Life | | Mean Tool Life (minutes) |
|---|---|---|---|---|
| | | Rep 1 | Rep 2 | |
| Kyon 3400 | SNGN433T0820 | 2.5 | 3.9 | 3.2 |
| CA340-67 | SNGN433T0820 | 8.0 | 7.7 | 7.8 |

The inventive hot-pressed ceramic cutting insert (Sample CA340-67) significantly outperformed the cutting insert of the comparative grade (KYON 3400). Applicants believe that this improvement in performance was due to the superior chemical wear resistance provided by the inventive ceramic cutting inserts at higher cutting speeds (e.g., 2000 sfm (610 smm)) wherein at such higher cutting speeds, the chemical wear exerts great influence over (i.e., dominates) the tool life.

Additional metalcutting test results demonstrate the performance of specific samples of the ceramic cutting insert of the invention. These test results are set forth below.

Except for the speed, each one of the tests referred to in Tables 5 and 6 was conducted at the following parameters: the feed equal to 0.015 inches (0.381 millimeters); the Depth of cut (DOC) equal to 0.100 inches (2.54 mm); and the coolant: dry. The speed for the tests reported in Table 5 was 1500 feet per minute (457 meters per minute) and the speed for the tests reported in Table 6 was 2000 feet per minute (610 meters per minute). For each of the tests, the geometry of the cutting insert was a SNG433T0820 style of cutting insert that had a negative 5 degree lead angle. The workpiece material was a round clean bar of ductile cast iron (80-55-06). The failure criteria for these tests set forth in Tables 5 and 6 were as follows: Flank Wear (UNIF)=0.020 inches (0.508 mm); Flank Wear (MAX)=0.020 inches (0.508 mm); Nose Wear=0.020 inches (0.508 mm); and Trailing Edge Wear=0.020 inches (0.508 mm).

TABLE 5

Metalcutting Test: Turning DCI 80-55-06
SNG-433T0820, 1500 sfm/.015 ipr/.1" doc/dry

| Insert # | Average Insert Wear After 6 min. Turning | | | | Mean Tool Life (min) |
|---|---|---|---|---|---|
| | FW | MW | NW | TW | |
| 1. KYON 3400 | 0.0124 | 0.0170 | 0.0190 | 0.0146 | 5.6 |
| 2. CA340-30 | 0.0143 | 0.0173 | 0.0165 | 0.0153 | 6.8 |
| 3. CA340-62 | 0.0139 | 0.0205 | 0.0154 | 0.0138 | 5.0 |
| 4. CA340-57 | 0.0130 | 0.0161 | 0.0148 | 0.0152 | 7.2 |
| 5. CA340-58 | 0.0129 | 0.0150 | 0.0152 | 0.0154 | 7.0 |
| 6. CA340-63 | 0.0125 | 0.0153 | 0.0153 | 0.0153 | 7.4 |

In Table 5 above, the designations "FW" means average flank wear reported in inches, "MW" means average maximum flank wear reported in inches, "NW" means average nose wear reported in inches, and "TW" means average trailing edge wear reported in inches. The mean tool life is reported in minutes.

Referring to the test results presented in Table 5 above, it is apparent that, for the most part, the hot-pressed ceramic cutting inserts of the invention outperformed the KYON 3400 ceramic cutting insert. The KYON 3400 cutting insert is a commercial cutting insert that is well-accepted for the use in the turning of ductile cast iron. More specifically, except for Insert No. 3 (Sample CA340-62) which had a mean tool life equal to about 89.2 percent of the mean tool life of the KYON 3400 cutting insert, all of the ceramic cutting inserts demonstrated an improved mean tool life. In this regard, Insert No. 2 (Sample CA340-30) had a mean tool life equal to about 121.4 percent of the mean tool life of the KYON 3400 cutting insert, Insert No. 4 (Sample CA340-57) had a mean tool life equal to about 128.6 percent of the mean tool life of the KYON 3400 cutting insert, Insert No. 5 (Sample CA340-58) had a mean tool life equal to 125 percent of the mean tool life of the KYON 3400 cutting insert, and Insert No. 6 (Sample CA340-63), which used the lanthanum oxide sintering aid, had a mean tool life equal to about 132.1 percent of the mean tool life of the KYON 3400 cutting insert.

Based upon a comparison of the test results for Insert No. 2 and Insert No. 3, it appears that the ceramic cutting insert that used the F800 boron carbide (from Electro-Abrasives) had better results (i.e., a longer mean tool life) than the ceramic cutting insert that used the HP boron carbide (from H.C. Starck).

A comparison of the test results for an alumina-boron carbide irregular-shaped phase ceramic cutting insert using yttria as the sintering aid (i.e., Insert No. 2) against the alumina-boron carbide irregular-shaped phase ceramic cutting inserts using other sintering aids shows that these other sintering aids (i.e., YAG, ytterbium and $La_2O_3$) provided for improved results in the form of a longer mean tool life.

Figure 4A:
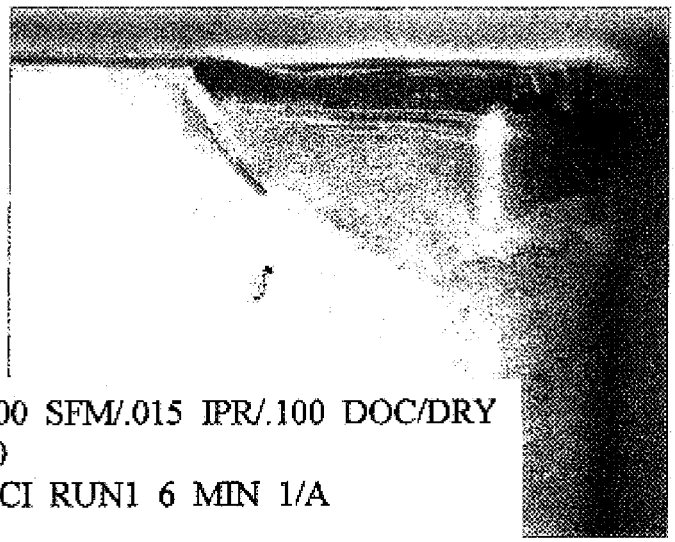
FIG. 4A is a colorized photograph (at a magnification equal to 30×) of the flank surface of a prior art ceramic cutting insert designated herein as Comparative Insert #1 [KYON 3400] showing the nature of the flank wear on the cutting insert after completion (duration of 6 minutes) of the testing set out in Table 5.
Figure 5A:
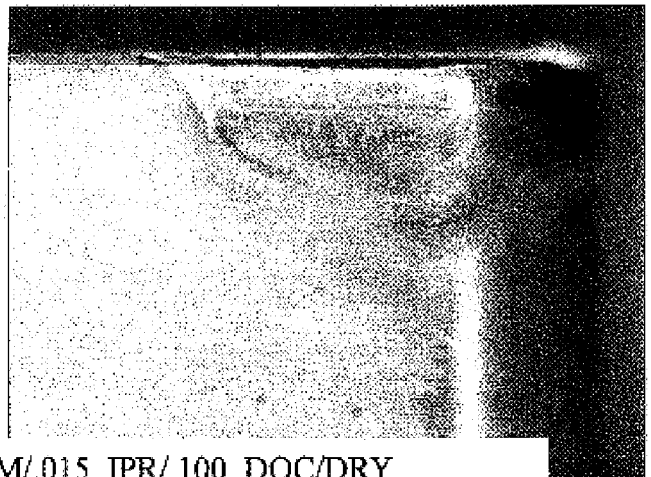
FIG. 5A is a colorized photograph (at a magnification equal to 30×) of the flank surface of Sample CA340-58 showing the nature of the flank wear on the cutting insert after completion (duration of 6 minutes) of the testing set out in Table 5.

FIGS. 4A and 5A illustrate the comparison of the flank wear properties between a Comparative Insert #1 and a hot-pressed cutting insert of the invention (Sample CA340-58). More specifically, FIG. 4A is a colorized photograph (at a magnification equal to 30×) of the flank surface of the Comparative Insert #1 [KYON 3400] showing the nature of the flank wear on the cutting insert after completion (duration of 6 minutes) of the testing set out in Table 5. FIG. 5A is a colorized photograph (at a magnification equal to 30×) of the flank surface of Sample CA340-58 showing the nature of the flank wear on the cutting insert after completion (duration of 6 minutes) of the testing set out in Table 5. It is apparent from an examination of the cutting inserts shown in FIGS. 4A and 5A, that the inventive hot-pressed ceramic cutting insert experienced less flank wear and a more uniform flank wear than did the prior art comparative cutting insert (Comparative Insert #1).

Figure 4B:
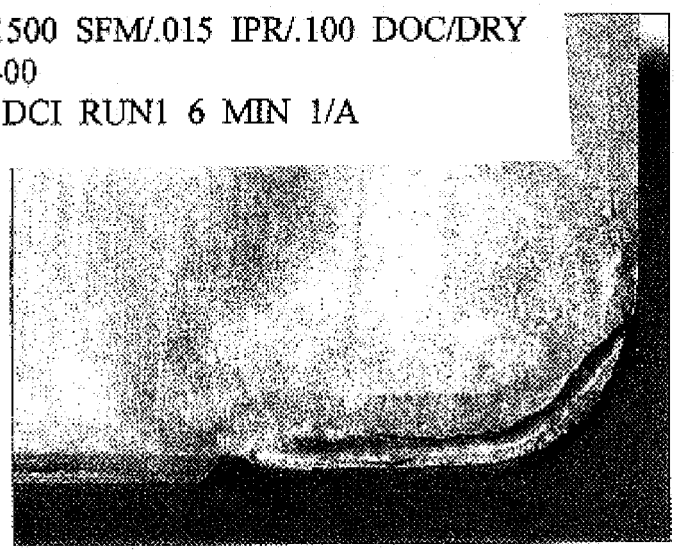
FIG. 4B is a colorized photograph (at a magnification equal to 30×) of the rake surface of a prior art ceramic cutting insert designated herein as Comparative Insert #1 [KYON 3400] showing the nature of the crater wear on the cutting insert after completion (duration of 6 minutes) of the testing set out in Table 5.
Figure 5B:
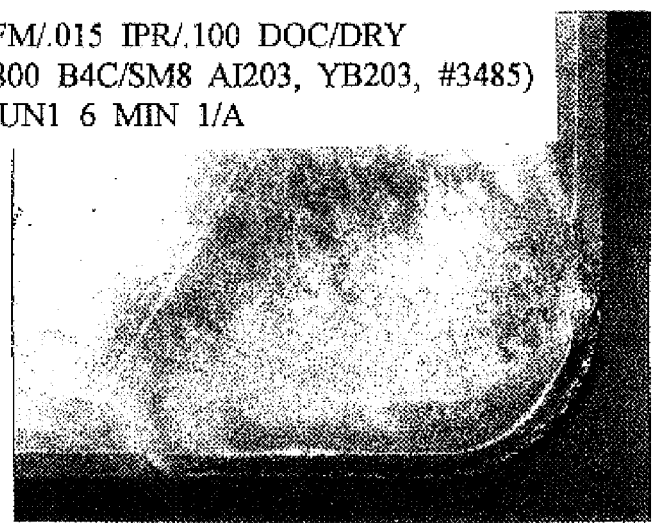
FIG. 5B is a colorized photograph (at a magnification equal to 30×) of the rake surface of Sample CA340-58 showing the nature of the crater wear on the cutting insert after completion (duration of 6 minutes) of the testing set out in Table 5.

FIGS. 4B and 5B show a comparison of the crater wear properties between a Comparative Insert #1 and a hot-pressed cutting insert of the invention (Sample CA340-58). More specifically, FIG. 4B is a colorized photograph (at a magnification equal to 30×) of the rake surface of the Comparative Insert #1 [KYON 3400] showing the nature of the crater wear on the cutting insert after completion (duration of 6 minutes) of the testing set out in Table 5. FIG. 5B is a colorized photograph (at a magnification equal to 30×) of the rake surface of Sample CA340-58 showing the nature of the crater wear on the cutting insert after completion (duration of 6 minutes) of the testing set out in Table 5. It is apparent from an examination of FIGS. 4B and 5B that the inventive hot-pressed ceramic cutting insert (Sample CA340-58) experienced less crater wear than did the prior art cutting insert (Comparative Insert #1).

Metalcutting tests also show that the inventive hot-pressed ceramic cutting inserts exhibit better performance (i.e., tool life) at even higher cutting speeds, e.g., on the order of 2000 sfm (610 smm). In this regard, Table 6 below sets forth the results for the turning of ductile cast iron at the parameters (including a speed equal to 2000 sfm (610 smm)) set forth by cutting inserts of the geometry (SNG-433T0820) presented in Table 6. As seen by the results presented in Table 6, the inventive cutting inserts exhibit a much greater mean tool life than the KYON 3400 cutting insert. More specifically, the Insert No. 2 (Sample CA340-30), which is an alumina-boron carbide irregular-shaped phase ceramic cutting insert that used the F800 boron carbide, had a mean tool life equal to 244 percent of the mean tool life of the KYON 3400 ceramic cutting insert. Insert No. 5 (Sample CA340-58), which is an alumina-boron carbide irregular-shaped phase ceramic cutting insert that used ytterbia as the sintering aid, had a mean tool life that was 292 percent of the mean tool life of the KYON 3400 ceramic cutting insert.

TABLE 6

Mean Tool Life Reported in Minutes
Turning DCI 80-55-06
SNG-433T0820, 2000 sfm/.015 ipr/.1" doc/dry

| Insert # | Test No. 1 | Test No. 2 | Mean Tool Life (min) |
| --- | --- | --- | --- |
| 1. KYON 3400 | 3.0 | 1.9 | 2.5 |
| 2. CA340-30 | 7.4 | 4.7 | 6.1 |
| 5. CA340-58 | 7.5 | 7.0 | 7.3 |
| 6. CA340-63 | 4.5 | 6.6 | 5.5 |

When increasing the turning speeds from 1500 sfm (457 m/min) to 2000 sfm (610 m/min), as shown in metal cutting test T10919 (Table 6 below), the performance of KY3400 degraded considerably while the influence of speeds on the performance of alumina-boron carbide composites was not so significant. The cutting insert (Sample CA340-63) that used lanthanum oxide as the sintering aid had a mean tool life that was over twice as long (i.e., 5.5 minutes vs. 2.5 minutes) as the mean tool life for the KYON 3400 cutting insert.

The specific examples set forth hereinafter, unless specifically designated as being produced by a different process, were produced by the process of sintering to full density wherein the preferred sintering to full density process comprises first pressureless sintering and then HIPing. To the extent that the starting powder mixtures used alumina, the alumina powder was the SM8 aluminum oxide sold by Baikowski International. For the examples that used boron carbide, the boron carbide powder was the F800 sold by Electro Abrasives. For the examples that used ytterbia, the ytterbium oxide was the same as that used by the earlier examples and sold by Molycorp Inc.

The specific examples produced by the sintering to full density process used some additional powders in the starting powder mixture. These powders are described below.

The zirconium oxide powder was sold by TOSOH USA, INC (3600 Gantz Road, Grove City, Ohio 43123 USA, USA toll free: 866-844-6953 Fax: +1-614-875-8066, e-mail: info@tosohusa.com), under the designation TZ-6Y, and has the following properties: 6% mol % $Y_2O_3$ and Specific Surface Area 16 $m^2/g$.

The aluminum powder was sold by ATLANTIC EQUIPMENT ENGINEERS (13 Foster Street, Bergenfield, N.J. 07621, Phone: (800) 486-2436 or (201) 384-5606 FAX: 201-387-0291, http://www.micronmetals.com), under the designation AL-104, and has the following properties: spherical powder, 99.9% purity, PSD of 1-3 micron.

The carbon black is typically available from many sources, such as carbon black Raven 410, supplied by Columbian Chemicals Company (1800 West Oak Commons Court, Marietta, Ga. 30062-2253, Phone: 770-792-9400). The Raven 410 has an average particle size of 101 nm, NSA surface area of 26 $m^2/g$ and 0.7% volatile.

Although none of the specific examples contained magnesium or zinc or hafnium oxide, applicants understand that suitable magnesium, zinc and hafnium oxide powders are available from ATLANTIC EQUIPMENT ENGINEERS (13 Foster Street, Bergenfield, N.J. 07621, Phone: (800) 486-2436 or (201) 384-5606 FAX: 201-387-0291, http://www.micronmetals.com), To produce the starting powder mixture for the below examples, the mixture of the starting powders of alumina and boron carbide and the sintering aid was subjected to ball-milling using high purity alumina cycloids for a duration equal to about 36 hours in alcohol. After completion of the ball-milling, the powder mixture was dried. Table 7 below sets forth the composition (volume percent) of the starting powder mixture for the examples (i.e., Mix No.) listed in the table.

TABLE 7

Starting Powder Compositions (Volume Percent) for Examples

| Mix No. | aluminum oxide | boron carbide | ytterbium oxide | aluminum | carbon | zirconium oxide |
| --- | --- | --- | --- | --- | --- | --- |
| CA340-76 | 74.62 | 24.88 | 0.50 | — | — | — |
| CA340-80B | 74.12 | 24.88 | 0.50 | 0.50 | — | — |
| CA340-80D | 74.37 | 24.88 | 0.50 | — | 0.25 | — |
| CA340-87 | 55.00 | 37.50 | — | — | — | 7.50 |
| CA340-89A | 73.00 | 25.00 | 0.50 | 1.50 | — | — |
| CA340-74A | 67.00 | 30.00 | 0.50 | 2.50 | — | — |
| CA340-89B | 73.75 | 25.00 | 0.50 | — | 0.75 | — |
| CA340-76A | 72.12 | 24.88 | 0.50 | 2.50 | — | — |

Example CA340-76 was hot-pressed according to the following parameters: hot pressing temperature equal to 1550° C., a hot-pressing pressure (in argon) equal to 28 MPa, and a hot-pressing duration equal to 60 minutes.

Table 8 below sets forth the processing parameters for the inventive examples produced via a sintering to full density process and as identified in Table 8. A ceramic body is considered to be at "full density" when its density is equal to or greater than about 98% percent of the theoretical density, and preferably, equal to or greater than about 99% of the theoretical density, and wherein the theoretical density is based upon the original starting powders and the original concentrations thereof.

The term "pressureless sintering" is a relative term in that it is used to describe a densification process in a relative sense to other densification processes wherein these other densification processes densify at higher pressures than the pressureless sintering process. Examples of these other densification processes, which employ higher pressures, include hot-pressing processes, gas pressure sintering processes and hot isostatic pressing processes. The preferred conditions for the pressureless sintering of the specific examples set forth herein were an argon protective atmosphere that was held at a pressure of between about 0.5 to about 1.0 pounds per square inch (psi), which equates in metric units to between about 3.4 KPa and about 6.9 KPa. However, it should be appreciated that applicants intend that "pressureless" sintering include sintering processes that use a pressure equal to or less than one atmosphere (760 torr) in an inert or a reducing gas atmosphere.

Furthermore, in the pressureless sintering process the preferred heating rate to the sintering temperature was equal to about 75° C. per minute and the preferred cooling rate from the sintering temperature to room temperature was equal to about 100° C. per minute. It should be appreciated that the heating rate can range between about 5° C. per minute and about 250° C. per minute, and the cooling rate can range between about 5° C. per minute and about 250° C. per minute.

The pressureless sintering occurs at a temperature that is equal to between about 1500° C. and about 1850° C. for a duration equal to between about 15 minutes and about 180 minutes. As an alternative, the pressureless sintering can occur at a temperature equal to between about 1600° C. and about 1750° C. for a duration equal to between about 30 minutes and about 60 minutes.

In regard to the processing steps, after completion of the ball-milling step, the starting powder mixture was pressed into a green SNG-433 cutting insert blank compact and then sintered according to the parameters set forth below in Table 8 to form a sintered body. The green body was then cold isostatically pressed at a pressure equal to 30,000 psi (206.9 MPa) to increase the green density thereof. Alternatively, the powder mixture could be pressed with a fugitive binder blended therein to avoid the need for cold isostatic pressing. Applicants contemplate that in those cases that use the fugitive binder, the fugitive binder can supply all or a part of the carbon, and hence, function as the reduction component.

As mentioned above, it is preferable that the pressureless sintered body is then subjected to a hot isostatic pressing (HIP) step. Exemplary HIPing parameters are set out in Table 8. For all of the examples the hot isostatic pressing step occurred in argon.

TABLE 8

Pressureless Sintering and HIP Parameters for Examples

| Mix No. | Sintering Temp (° C.) | Sintering Duration (Minutes) | HIP Temp (° C.) | HIP Pressure (MPa) | HIP Duration (Minutes) |
| --- | --- | --- | --- | --- | --- |
| CA340-80B | 1850 | 60 | 1650 | 137 | 60 |
| CA340-80D | 1850 | 60 | 1650 | 137 | 60 |
| CA340-87 | 1825 | 60 | 1575 | 137 | 60 |
| CA-340-89A | 1825 | 60 | 1575 | 138 | 60 |
| CA-340-74A | 1800 | 60 | 1575 | 138 | 60 |
| CA-340-89B | 1825 | 60 | 1575 | 138 | 60 |
| CA-340-76A | 1825 | 60 | 1650 | 138 | 60 |

The HIPing can occur at a temperature equal to between about 1400° C. and about 1725° C., a pressure equal to or greater than about 3.4 MPa, and for a duration equal to between about 15 minutes and about 120 minutes. As an alternative, the HIPing can occur at a temperature equal to between about 1600° C. and about 1700° C., a pressure equal to or greater than about 50 MPa and for a duration equal to between about 30 minutes and about 60 minutes.

Tables 9 through 15 present the results of taking three measurements for selected ceramic materials of selected physical properties per the techniques identified above. These three measurements were averaged and the average is set out.

TABLE 9

Selected Physical Parameters for Hot-Pressed Alumina-Boron Carbide Composition CA340-76

| Sample | Young's Modulus (GPa) | Vickers Hardness (GPa) | $K_{IC}$ (E & C) (MPa · m$^{1/2}$) |
| --- | --- | --- | --- |
| 1 | 386.00 | 16.92 | 5.47 |
| 2 | 386.00 | 16.45 | 5.51 |
| 3 | 386.00 | 16.34 | 5.44 |
| Average | 386.00 | 16.57 | 5.47 |

The density of Example CA340-76 was equal to 3.677 grams per cubic centimeter, which is equal to about 99.9 percent of the theoretical density wherein the theoretical density is based upon the composition and amount of the specific starting materials.

TABLE 10

Selected Physical Parameters for Sintered/HIP Alumina-Boron Carbide Composition CA340-80B

| Example | Young's Modulus (GPa) | Vickers Hardness (GPa) | $K_{IC}$ (E & C) (MPa · m$^{1/2}$) |
| --- | --- | --- | --- |
| 1 | 399.00 | 18.74 | 6.12 |
| 2 | 399.00 | 19.02 | 6.95 |
| 3 | 399.00 | 17.80 | 6.90 |
| Average | 399.00 | 18.52 | 6.65 |

The density for Example CA340-80B is 3.731 grams per cubic centimeter (g/cc), which is equal to about 101 percent of the theoretical density wherein the theoretical density is based upon the composition and amount of the specific starting materials.

Figure 6:
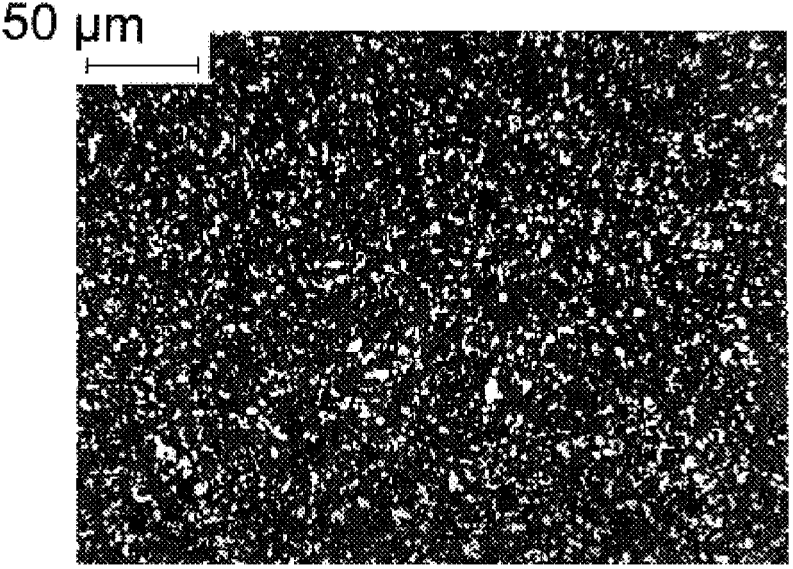
FIG. 6 is a color optical photomicrograph (with a scale of 50 micrometers) of the microstructure of Example CA340-80B.
Figure 7:
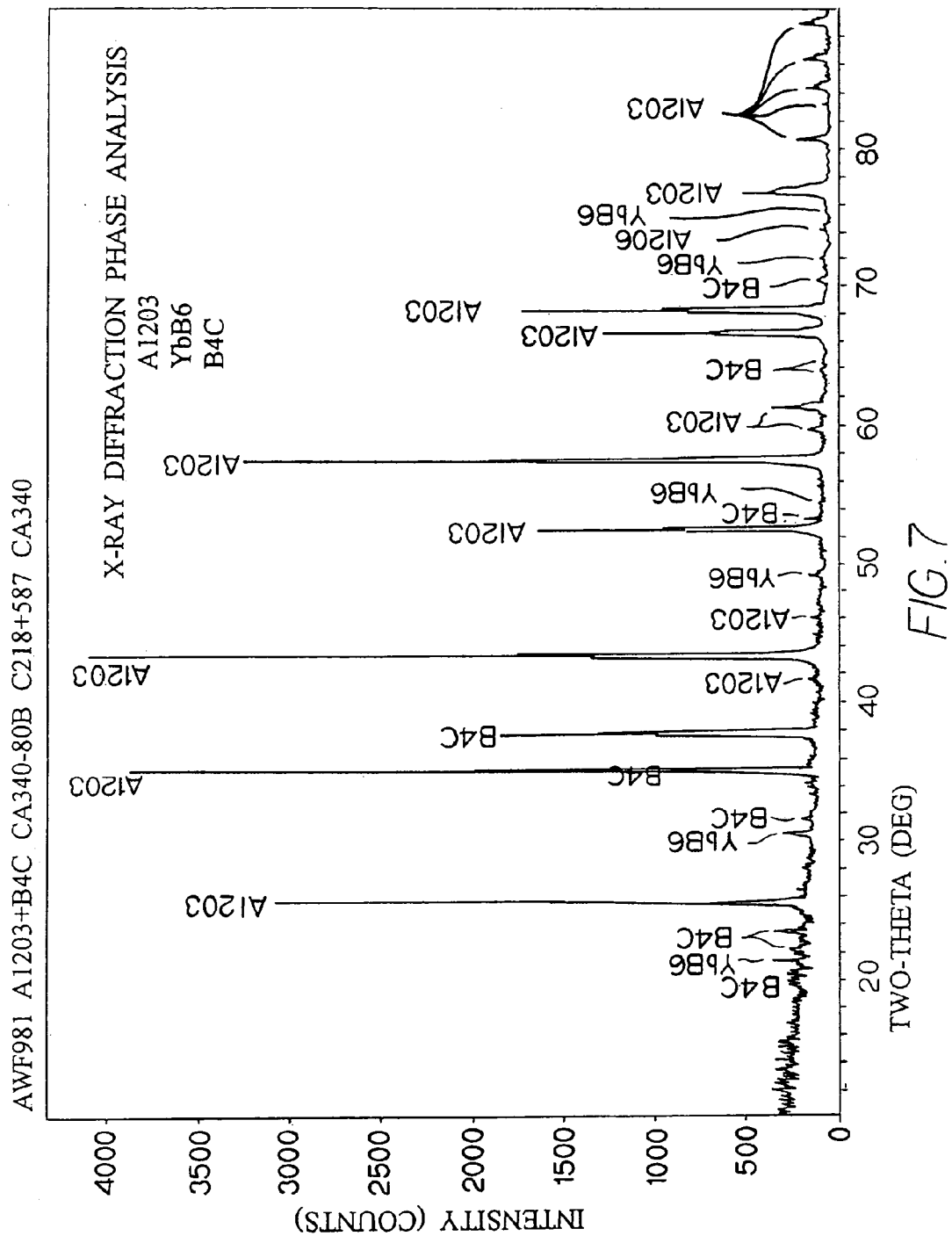
FIG. 7 is an x-ray diffraction phase analysis for Example CA340-80B wherein the peaks show the presence of aluminum oxide ($Al_2O_3$), boron carbide ($B_4C$) and ytterbium boride ($YbB_6$)

Referring to the photomicrograph of the CA340-80B material, FIG. 6, this optical image shows the microstructure of the polished sample. Looking at the photomicrograph (FIG. 6), applicants believe that four phases are shown in FIG. 6. What applicants believe to be the boron carbide ($B_4C$) phase is shown in FIG. 6 as a bright phase. In regard to the ytterbium boride ($YbB_6$) phase, which applicants believe is present, while this phase is visible under a scanning electron microscope, the resolution in this optical photomicrograph (FIG. 6) is such that this phase is difficult to distinguish. Applicants consider the balance of the microstructure shown in FIG. 6 to comprise a matrix. Applicants believe that the matrix comprises an alumina (aluminum oxide) phase and an alumina-based solid solution phase wherein the contrast in color distinguishes between these phases. In this regard, what applicants believe to be the alumina phase is shown in FIG. 6 as the phase of the matrix that is lighter (relative to the other matrix phase) in color, and what applicants believe to be the alumina-based solid solution phase is shown in FIG. 6 as the phase of the matrix that is darker (relative to the other matrix phase) in color. The dark areas in the optical photomicrograph (FIG. 6) appear to be locations at which the boron carbide has been pulled out during sample preparation. The XRD analysis results as presented in FIG. 7 verified the presence of alumina ($Al_2O_3$), boron carbide ($B_4C$) and ytterbium boride ($YbB_6$).

TABLE 11

Selected Physical Parameters for
Sintered/HIP Alumina-Boron Carbide Composition
CA340-80D

| Sample | Young's Modulus (GPa) | Vickers Hardness (GPa) | $K_{IC}$ (E & C) (MPa · m$^{1/2}$) |
|---|---|---|---|
| 1 | 398.00 | 17.93 | 6.74 |
| 2 | 398.00 | 18.74 | 5.73 |
| 3 | 398.00 | 18.46 | 6.29 |
| Average | 398.00 | 18.38 | 6.25 |

The density of Example CA340-80D is equal to 3.736 grams per cubic centimeter, which is equal to about 101 percent of the theoretical density wherein the theoretical density is based upon the composition and amount of the specific starting materials.

Figure 8:
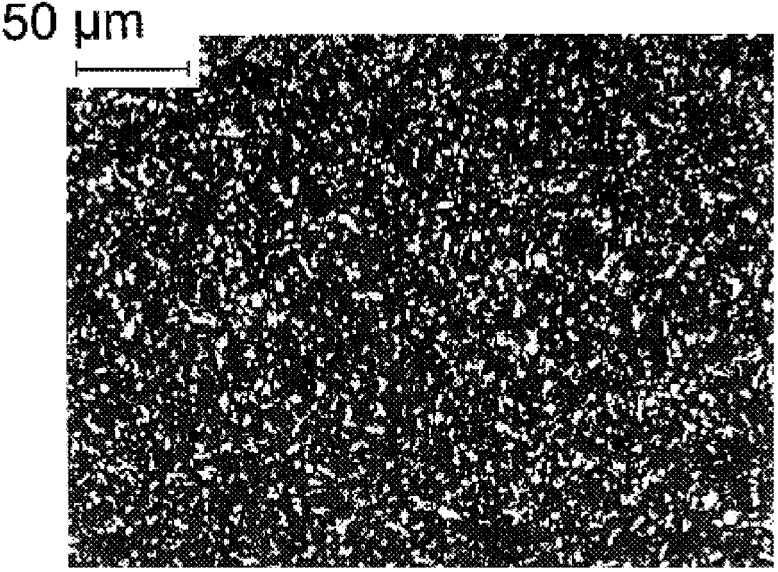
FIG. 8 is a color optical photomicrograph (with a scale of 50 micrometers) of the microstructure of Example CA340-80D.
Figure 9:
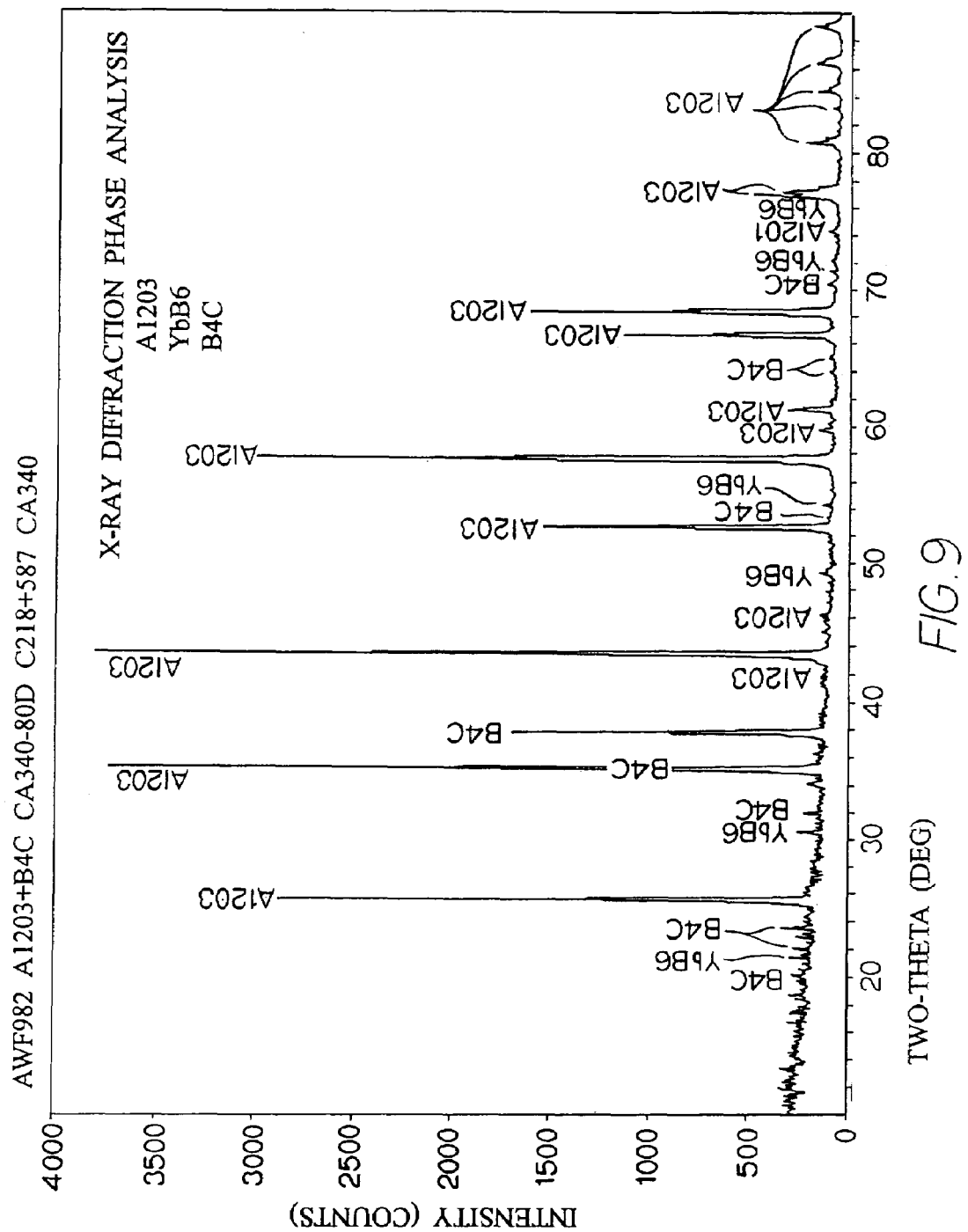
FIG. 9 is an x-ray diffraction phase analysis for Example CA340-80D wherein the peaks show the presence of aluminum oxide, boron carbide and ytterbium boride.

Referring to the photomicrograph of the CA340-80D material, FIG. 8, this optical image shows the microstructure of the polished sample. Looking at the photomicrograph (FIG. 8), applicants believe that four phases are shown in FIG. 8. What applicants believe to be the boron carbide ($B_4C$) phase is shown in FIG. 8 as a bright phase. In regard to the ytterbium boride ($YbB_6$) phase, which applicants believe is present, while this phase is visible under a scanning electron microscope, the resolution in this optical photomicrograph (FIG. 8) is such that this phase is difficult to distinguish. Applicants consider the balance of the microstructure shown in FIG. 8 to comprise a matrix. Applicants believe that the matrix comprises an alumina (aluminum oxide) phase and an alumina-based solid solution phase wherein the contrast in color distinguishes between these phases. In this regard, what applicants believe to be the alumina phase is shown in FIG. 8 as the phase of the matrix that is lighter (relative to the other matrix phase) in color, and what applicants believe to be the alumina-based solid solution phase is shown in FIG. 8 as the phase of the matrix that is darker (relative to the other matrix phase) in color. The dark areas in the optical photomicrograph (FIG. 8) appear to be locations at which the boron carbide has been pulled out during sample preparation. The XRD analysis results as presented in FIG. 9 verified the presence of alumina ($Al_2O_3$), boron carbide ($B_4C$) and ytterbium boride ($YbB_6$).

No amount of the initial $Yb_2O_3$ component was detectable via XRD analysis. Hence, applicants believe that the ytterbia ($Yb_2O_3$) component either completely reacted with $B_4C$ to form the ytterbium boride ($YbB_6$) detected via XRD analysis or reacted to such an extent where ytterbium boride ($YbB_6$) was detectable via XRD analysis any remaining (if that was the case) and ytterbia was not detectable via XRD analysis.

Figure 10:
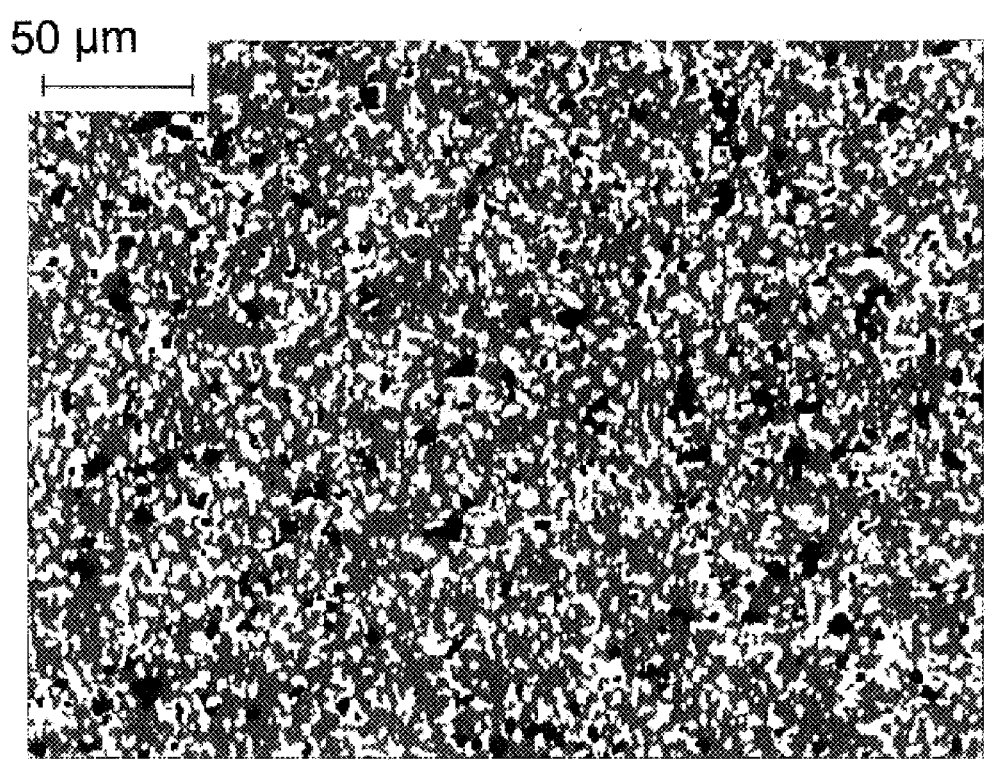
FIG. 10 is a color optical photomicrograph (with a scale of 50 micrometers) of the microstructure of Example CA340-87.
Figure 11:
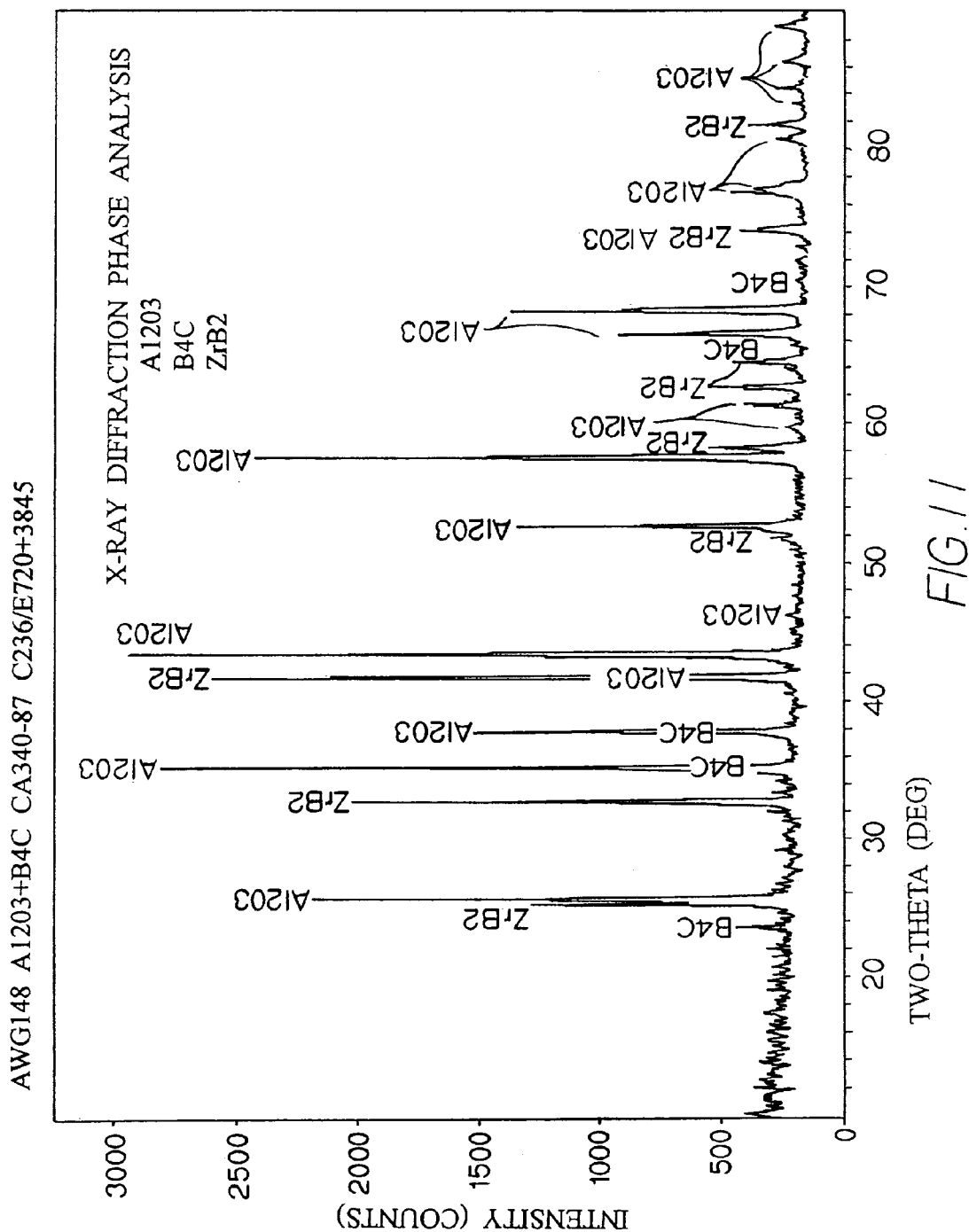
FIG. 11 is an x-ray diffraction phase analysis for Example CA340-87 wherein the peaks show the presence of aluminum oxide ($Al_2O_3$), boron carbide ($B_4C$) and zirconium boride ($ZrB_2$)

Referring to the photomicrograph of the CA340-87 material, FIG. 10, this optical image shows the microstructure of the polished sample. Looking at the photomicrograph (FIG. 10), applicants believe that four phases are shown in FIG. 10. What applicants believe to be the boron carbide ($B_4C$) phase and the zirconium boride ($ZrB_2$) phase are each shown in FIG. 10 as a bright phase. In this regard, the resolution in the optical photomicrograph is such that it is difficult to distinguish between the boron carbide phase and the zirconium boride phase. Applicants consider the balance of the microstructure shown in FIG. 10 to comprise a matrix. Applicants believe that the matrix comprises an alumina (aluminum oxide) phase and an alumina-based solid solution phase wherein the contrast in color distinguishes between these phases. In this regard, what applicants believe to be the alumina phase is shown in FIG. 10 as the phase of the matrix that is lighter (relative to the other matrix phase) in color, and what applicants believe to be the alumina-based solid solution phase is shown in FIG. 10 as the phase of the matrix that is darker (relative to the other matrix phase) in color. The dark areas in the optical photomicrograph (FIG. 10) appear to be locations at which either the boron carbide or the zirconium boride has been pulled out during sample preparation. The XRD analysis results as presented in FIG. 11 shows the presence of alumina ($Al_2O_3$), boron carbide $B_4C$) and zirconium boride ($ZrB_2$). Applicants theorize that the chemical reaction below may have occurred during the sintering:

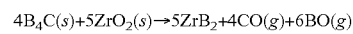

$$4B_4C(s) + 5ZrO_2(s) \rightarrow 5ZrB_2 + 4CO(g) + 6BO(g)$$

No amount of initial zirconia ($ZrO_2$) component was detectable via XRD analysis. Hence, applicants believe that the initial zirconia component either completely reacted with $B_4C$ to form the $ZrB_2$ detected via the XRD analysis or reacted to such an extent that the zirconium boride was detectable via XRD analysis and any remaining (if that was the case) zirconia was not detectable via XRD analysis. After the sintering operations, there were only three detectable phases that were detected via XRD analysis, and those were alumina ($Al_2O_3$), boron carbide ($B_4C$) and zirconium boride ($ZrB_2$).

TABLE 12

Selected Physical Parameters for
Sintered/HIP Alumina-Boron Carbide Composition
CA340-89A

| Sample | Young's Modulus (GPa) | Vickers Hardness (GPa) | $K_{IC}$ (E & C) (MPa · m$^{1/2}$) |
|---|---|---|---|
| 1 | 394.00 | 17.05 | 5.58 |
| 2 | 394.00 | 16.69 | 6.44 |
| 3 | 394.00 | 16.57 | 5.92 |
| Average | 394.00 | 16.77 | 5.98 |

The density of Example CA340-89A is equal to 3.703 grams per cubic centimeter, which is equal to about 100 percent of the theoretical density wherein the theoretical density is based upon the composition and amount of the specific starting materials.

Figure 12:
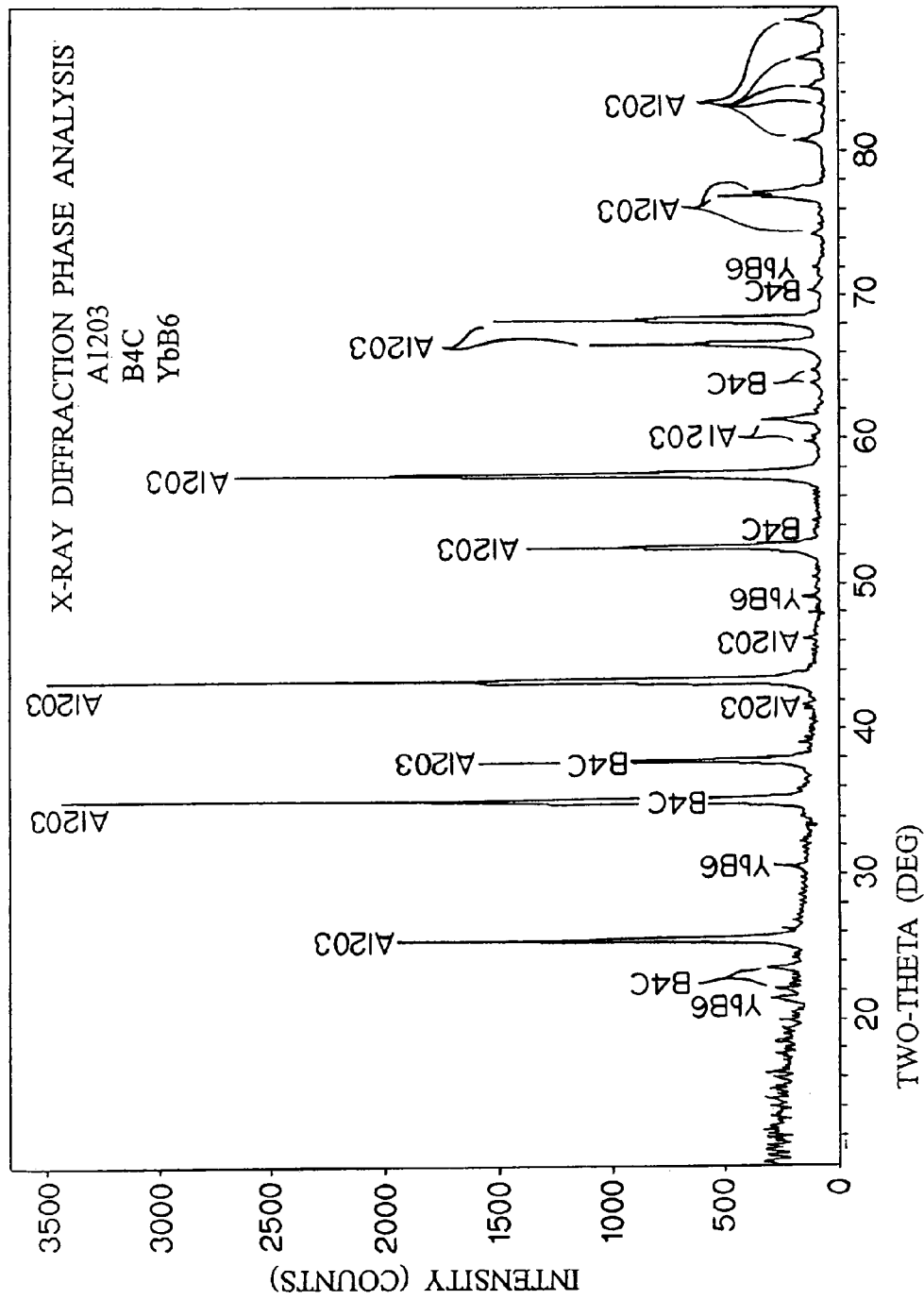
FIG. 12 is an x-ray diffraction phase analysis for Example CA340-89A wherein the peaks show the presence of aluminum oxide ($Al_2O_3$), boron carbide ($B_4C$) and ytterbium boride ($YbB_6$)

The XRD analysis results as presented in FIG. 12 shows the presence of alumina ($Al_2O_3$), boron carbide ($B_4C$) and ytterbium boride ($YbB_6$). The metallic aluminum was not detectable via XRD analysis. Applicants believe that the metallic aluminum either completely reacted (or reacted to such an extent so as to not be detectable via XRD analysis) during the sintering by reacting with the thin $B_2O_3$ coating on the $B_4C$ particles whereby the aluminum was converted to alumina while leaving boron which reacted with the carbon-rich environment to form $B_4C$.

No amount of the initial $Yb_2O_3$ component was detectable via XRD analysis. Hence, applicants believe that the ytterbia component either completely reacted with $B_4C$ to form the $YbB_6$ detected via XRD analysis or reacted to such an extent where ytterbium boride was detectable via XRD analysis and any remaining (if that was the case) ytterbia was not detectable via XRD analysis. After the sintering operations, there were only three detectable phases that were detected via XRD analysis, and those were alumina ($Al_2O_3$), boron carbide ($B_4C$) and zirconium boride ($ZrB_2$).

TABLE 13

Selected Physical Parameters for
Sintered/HIP Alumina-Boron Carbide Composition
CA340-74A

| Sample | Young's Modulus (GPa) | Vickers Hardness (GPa) | $K_{IC}$ (E & C) (MPa · $m^{1/2}$) |
|---|---|---|---|
| 1 | 393.00 | 15.79 | 7.32 |
| 2 | 393.00 | 16.80 | 6.74 |
| 3 | 393.00 | 16.57 | 6.92 |
| Average | 393.00 | 16.39 | 6.99 |

The density for Example CA340-74A is equal to 3.633 grams per cubic centimeter, which is equal to about 99.9 percent of the theoretical density wherein the theoretical density is based upon the composition and amount of the specific starting materials.

TABLE 14

Selected Physical Parameters for
Sintered/HIP Alumina-Boron Carbide Composition
CA340-89B

| Sample | Young's Modulus (GPa) | Vickers Hardness (GPa) | $K_{IC}$ (E & C) (MPa · $m^{1/2}$) |
|---|---|---|---|
| 1 | 390.00 | 17.29 | 6.50 |
| 2 | 390.00 | 17.93 | 6.29 |
| 3 | 390.00 | 18.06 | 6.12 |
| Average | 390.00 | 17.76 | 6.30 |

The density for Example CA340-89B is equal to 3.695 grams per cubic centimeter which is equal to about 99.9 percent of the theoretical density wherein the theoretical density is based upon the composition and amount of the specific starting materials.

TABLE 15

Selected Physical Parameters for
Sintered/HIP Alumina-Boron Carbide Composition
CA340-76A

| Sample | Young's Modulus (GPa) | Vickers Hardness (GPa) | $K_{IC}$ (E & C) (MPa · $m^{1/2}$) |
|---|---|---|---|
| 1 | 368.00 | 18.19 | 5.74 |
| 2 | 368.00 | 17.29 | 6.66 |
| 3 | 368.00 | 17.93 | 6.08 |
| Average | 368.00 | 17.80 | 6.16 |

The density for Example CA340-76A is equal to 3.713 grams per cubic centimeter, which is equal to about 101 percent of the theoretical density wherein the theoretical density is based upon the composition and amount of the specific starting materials.

Figure 13:
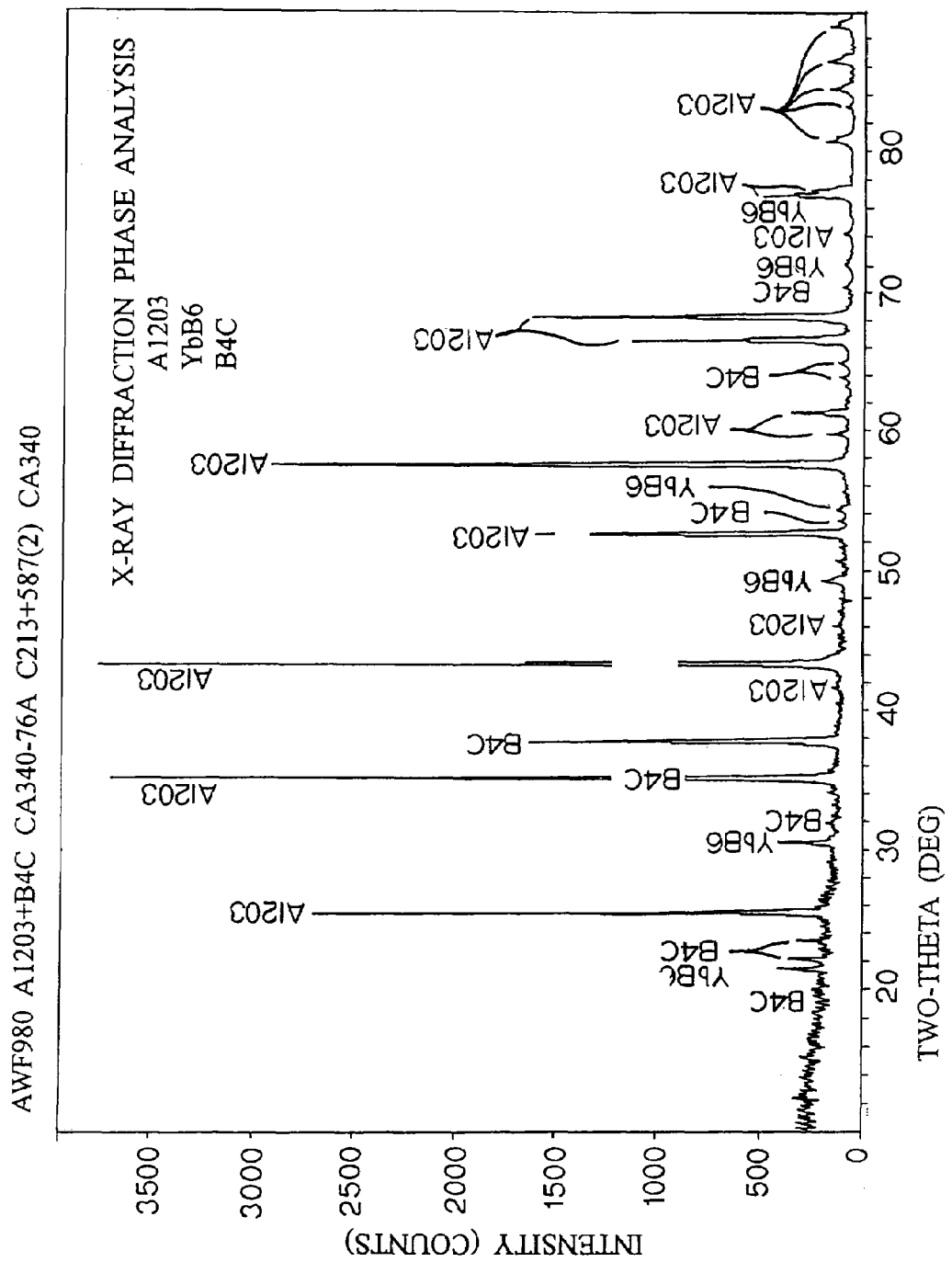
FIG. 13 is an x-ray diffraction phase analysis for Example CA340-76A wherein the peaks show the presence of aluminum oxide ($Al_2O_3$), boron carbide ($B_4C$) and ytterbium boride ($YbB_6$).

The XRD analysis results as presented in FIG. 13 shows the presence of alumina ($Al_2O_3$), boron carbide ($B_4C$) and ytterbium boride ($YbB_6$). The metallic aluminum was not detectable via XRD analysis. Applicants believe that the metallic aluminum either completely reacted (or reacted to such an extent so as to not be detectable via XRD analysis) during the sintering by reacting with the thin $B_2O_3$ coating on the $B_4C$ particles whereby the aluminum was converted to alumina while leaving boron, which reacted with the carbon-rich environment to form $B_4C$.

No amount of the initial $Yb_2O_3$ component was detectable via XRD analysis. Hence, applicants believe that the ytterbia component either completely reacted with $B_4C$ to form the $YbB_6$ detected via the XRD analysis or reacted to such an extent where ytterbium boride was detectable via XRD analysis and any remaining (if that was the case) ytterbia was not detectable via XRD analysis. After the sintering operations, there were only three detectable phases that were detected via XRD analysis, and those were alumina ($Al_2O_3$), boron carbide ($B_4C$) and zirconium boride ($ZrB_2$).

It is not unusual for the boron carbide to have a thin coating of boron oxide ($B_2O_3$) thereon. Applicants are of the belief that the presence of the boron oxide coating has been detrimental to the densification of the ceramic because the boron oxide inhibits the densification. Applicants believe that it would be advantageous to be able to reduce the boron oxide content during sintering, and thus, protect the boron carbide from oxidation loss and promote the densification.

In some of the specific examples, carbon black is present in Example CA340-80D (0.25 volume percent carbon black) and Example CA340-89B (0.75 volume percent carbon black). Applicants theorize that since the sintering may have occurred in a carbon rich environment, the carbon may have reacted with the boron oxide coating to form $B_4C$ according to the following reaction:

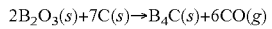

$2B_2O_3(s) + 7C(s) \rightarrow B_4C(s) + 6CO(g)$

It is thus apparent that the presence of the carbon black in the starting powder mixture is beneficial to the reduction of the boron oxide and the densification.

A metallic aluminum component is present in Example CA340-80B (0.50 volume percent metallic aluminum), Example CA340-89A (1.50 volume percent metallic aluminum), Example CA340-74A (2.50 volume percent metallic aluminum), and Example CA340-76A (2.50 volume percent metallic aluminum). For these examples that use metallic aluminum, applicants theorize that the following reaction may have occurred during sintering in a carbon-containing atmosphere (or if a carbon-containing component was present in the starting powder mixture):

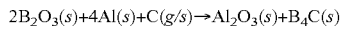

$2B_2O_3(s) + 4Al(s) + C(g/s) \rightarrow Al_2O_3(s) + B_4C(s)$

As can be appreciated from some of the examples, the thin film of boron oxide reacts upon sintering with the carbon or the aluminum to from other compounds. In the case of aluminum, the resultant compounds could be alumina and boron carbide. In the case of carbon, the resultant compounds could be boron carbide and carbon monoxide gas. For each case, there could occur the reduction of the boron oxide and the production of boron carbide. Hence, the aluminum or carbon is present in an effective amount for the protection of the boron carbide from oxidation (loss) and to assist the densification.

Applicants contemplate that metallic additives other than aluminum should function to protection the boron carbide from oxidation loss during sintering. These metallic additives include magnesium and zinc. The carbon can be present in any one of a number of forms. Exemplary forms are carbon black or an organic compound such as phenolic resin, as well as a fugitive binder such as a wax.

In regard to the content in the starting powder mixture of the metallic additive (e.g., aluminum, magnesium and/or zinc) and the carbon-containing compound (e.g., carbon black or an organic compound), one preferred range is equal to between about 0.01 volume percent and about 5.0 volume percent of the starting powder mixture. Another preferred range for the content of the metallic additive and the carbon-containing component is equal to between 0.05 volume percent and about 3.0 volume percent of the starting powder mixture. Still another preferred range for the content of the metallic additive and the carbon-containing component is equal to between 0.50 volume percent and about 2.0 volume percent of the starting powder mixture.

A zirconia (zirconium oxide) component is in Example CA340-87 (7.50 volume percent zirconia). As set out above, applicants theorize that the zirconia may have reacted with the boron carbide to form zirconium boride and carbon monoxide gas and boron oxide gas. In reference to the content of zirconia in the starting powder mixture, one preferred range is equal to between about 1 volume percent and about 15 volume percent of the starting powder mixture. Another preferred range of the zirconia is equal to between about 6 volume percent and about 10 volume percent of the starting powder mixture.

Table 16 is set out as a summary of the selected properties presented in tables 9 through 15.

TABLE 16

Average Values For Selected Properties in Tables 9-15

| Sample | Young's Modulus (GPa) | Vickers Hardness (GPa) | $K_{IC}$ (E&C) (MPa·m$^{1/2}$) |
|---|---|---|---|
| CA-340-76 | 386.00 | 16.57 | 5.47 |
| CA-340-89A | 394.00 | 16.77 | 5.98 |
| CA-340-74A | 393.00 | 16.39 | 6.99 |
| CA-340-80D | 398.00 | 18.38 | 6.25 |
| CA-340-80B | 399.00 | 18.52 | 6.65 |
| CA-340-89B | 390.00 | 17.76 | 6.30 |
| CA-340-76A | 368.00 | 17.80 | 6.16 |

Overall, it is apparent that applicants have invented a new and useful ceramic body that comprises alumina and a boron carbide irregular-shaped phase, and optionally, the sintering aid residue from a sintering aid contained in the starting powder mixture. The ceramic body can be used as a wear member, as well as an uncoated ceramic cutting insert or a coated ceramic cutting insert.

When used as a ceramic cutting insert, the ceramic substrate has maintained its wear resistance even at higher operating temperatures, especially those temperatures associated with higher cutting speeds (e.g., a speed equal to or greater than about 1500 sfm (457 smm), or at even higher cutting speeds equal to or greater than about 2000 sfm (610 smm)). The ceramic substrate has also been able to exhibit good chemical resistance with respect to the workpiece material.

These improved properties demonstrate that overall the alumina-boron carbide irregular-shaped phase ceramic cutting inserts of the invention outperform (as measured by mean tool life in the turning of ductile cast iron) the conventional commercial ceramic cutting insert (a CVD coated silicon nitride cutting insert). This is especially true at higher cutting speeds in the order of 2000 sfm (610 smm). This is also markedly apparent when the sintering aid comprises a material like YAG or $Yb_2O_3$ or $La_2O_3$ or $Y_2O_3$.

It is also apparent that applicants have invented a ceramic body that contains alumina and boron carbide, as well as a pressureless sintering process for producing the ceramic body, wherein the pressureless sintering process is not as expensive as hot pressing process.

It is also apparent that applicants have invented a ceramic body that contains alumina and boron carbide, as well as a process for producing the ceramic body, wherein the process is able to fabricate parts with a complicated or complex geometry.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A method of machining a workpiece comprising the steps of:
providing a workpiece;
providing a ceramic cutting insert formed from the consolidation of a starting powder mixture and having a rake surface and a flank surface wherein the rake surface and the flank surface intersect to form a cutting edge and the ceramic cutting insert having a substrate that comprises between about 15 volume percent and about 35 volume percent of a boron carbide phase and at least about 50 volume percent alumina, the substrate further contains the residue from one or more sintering aids present in the starting powder mixture in an amount between about 0.5 volume percent and about 5 volume percent of the starting powder mixture and being selected from the group comprising yttrium oxide, ytterbium oxide, yttrium aluminum garnet, lanthanum oxide, chromium oxide, and other rare earth oxides, and has a fracture toughness ($K_{IC}$, 18.5 Kg Load E&C) greater than or equal to about 4.5 MPa·m$^{0.5}$;
causing relative rotational movement between the workpiece and the ceramic cutting insert wherein the surface speed of the relative rotational movement is equal to or greater than about 457 surface meters per minute; and
bringing the ceramic cutting insert and the workpiece into contact with each other so as to remove material from the workpiece.

2. The method of claim 1 wherein the surface speed of the relative rotational movement is equal to or greater than about 610 surface meters per minute.

3. The method of claim 1 wherein the workpiece material is cast iron.

4. The method of claim 1 wherein the workpiece material is ductile cast iron.

5. The method of claim 1 wherein the substrate has a coating thereon.

6. A method of machining a workpiece comprising the steps of:
providing a workpiece;
providing a ceramic cutting insert having a rake surface and a flank surface wherein the rake surface and the flank surface intersect to form a cutting edge and the ceramic cutting insert having a substrate that has a fracture toughness ($K_{IC}$, 18.5 Kg Load E&C) greater than or equal to about 4.5 MPa·m$^{0.5}$, and wherein the substrate being formed from a starting powder mixture comprising between about 15 volume percent and about 50 volume percent of a boron carbide irregular-shaped phase and at least about 50 volume percent alumina, and the starting powder mixture further comprising an effective amount to achieve full densification of a metal component including one or more of aluminum, magnesium and zinc;

causing relative rotational movement between the workpiece and the ceramic cutting insert wherein the surface speed of the relative rotational movement is equal to or greater than about 457 surface meters per minute; and bringing the ceramic cutting insert and the workpiece into contact with each other so as to remove material from the workpiece.

7. The method of machining of claim 6 wherein the substrate further includes ytterbium boride.

8. The method of machining of claim 6 wherein the metal component comprises aluminum.

9. The method of machining of claim 6 wherein the metal component comprises magnesium.

10. The method of machining of claim 6 wherein the metal component comprises zinc.

11. The method of machining of claim 6 wherein the starting powder mixture further comprising a reduction component containing carbon.

12. The method of machining of claim 6 wherein the starting powder mixture contains between about 15 volume percent and about 35 volume percent boron carbide, and at least about 50 volume percent alumina.

13. The method of machining of claim 6 wherein the starting powder mixture contains between about 20 volume percent and about 30 volume percent boron carbide, and at least about 50 volume percent alumina.

14. The method of machining of claim 6 wherein the effective amount of the metal component is equal to an amount between about 0.01 volume percent and about 5.0 volume percent of the starting powder mixture.

15. The method of machining of claim 6 wherein the substrate further contains the residue from one or more sintering aids selected from the group comprising yttrium oxide, ytterbium oxide, yttrium aluminum garnet, lanthanum oxide, chromium oxide, and other rare earth oxides.

* * * * *